(12) United States Patent
Shirakawa et al.

(10) Patent No.: US 12,523,500 B2
(45) Date of Patent: *Jan. 13, 2026

(54) POSITION DETECTION DEVICE

(71) Applicant: Proterial, Ltd., Tokyo (JP)

(72) Inventors: Yohei Shirakawa, Tokyo (JP); Yuta Sugiyama, Tokyo (JP); Yoshiaki Yanagisawa, Tokyo (JP); Yoshitake Ageishi, Tokyo (JP); Yukio Ikeda, Tokyo (JP)

(73) Assignee: Proterial, Ltd., Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 18/488,495

(22) Filed: Oct. 17, 2023

(65) Prior Publication Data

US 2024/0142275 A1    May 2, 2024

(30) Foreign Application Priority Data

Oct. 26, 2022 (JP) ................................. 2022-171656
Jan. 27, 2023 (JP) ................................. 2023-010655
Sep. 28, 2023 (JP) ................................. 2023-166696

(51) Int. Cl.
*G01D 5/20* (2006.01)
*B62D 5/00* (2006.01)
(Continued)

(52) U.S. Cl.
CPC .............. *G01D 5/20* (2013.01); *B62D 5/001* (2013.01); *B62D 5/046* (2013.01); *B62D 15/0215* (2013.01)

(58) Field of Classification Search
CPC .... G01D 5/20; G01D 2205/18; G01D 5/2053; B62D 5/001; B62D 5/046; B62D 15/0215; B62D 15/0225
See application file for complete search history.

(56) References Cited

U.S. PATENT DOCUMENTS

2010/0179727 A1* 7/2010 Luthje .................. G01D 5/2492
                                                        701/41
2021/0094610 A1* 4/2021 Yamaguchi .......... B62D 5/0469
(Continued)

FOREIGN PATENT DOCUMENTS

JP          2009-002770 A      1/2009

*Primary Examiner* — Akm Zakaria
(74) *Attorney, Agent, or Firm* — Studebaker Brackett PLLC

(57) ABSTRACT

A position detection device configured to detect a position of a moving member that moves back and forth in a predetermined moving direction is provided with an exciting coil arranged to extend in the moving direction along the moving member, a detection coil that, by a magnetic field generated by the exciting coil, outputs a voltage corresponding to a position of a detection object portion moving together with the moving member within a predetermined detection range in the moving direction, and a calculation unit that determines the position of the moving member by calculation based on an output voltage of the detection coil. The detection object portion has a predetermined length in the moving direction, and a voltage is generated in the detection coil due to a difference in magnetic field intensity between a portion corresponding to the detection object portion and a portion not corresponding to the detection object portion. During movement of the moving member in one direction, the output voltage of the detection coil changes sinusoidally over the entire period between when the detection coil and at least a portion of the detection object portion begin to line up in a direction perpendicular to the moving direction and when the entire detection object portion becomes out of alignment with the detection coil in the direction perpendicular to the moving direction.

10 Claims, 18 Drawing Sheets

(51) Int. Cl.
*B62D 5/04* (2006.01)
*B62D 15/02* (2006.01)

(56) References Cited

U.S. PATENT DOCUMENTS

2024/0077334 A1* 3/2024 Shirakawa ......... B62D 15/0225
2024/0094031 A1* 3/2024 Shirakawa ......... B62D 15/0225

* cited by examiner

POSITION DETECTION DEVICE

CROSS-REFERENCE TO RELATED APPLICATIONS

The present application is based on Japanese patent application No. 2022-171656 filed on Oct. 26, 2022, Japanese patent application No. 2023-010655 filed on Jan. 27, 2023, and Japanese patent application No. 2023-166696 filed on Sep. 28, 2023, the entire contents of which are incorporated herein by reference.

TECHNICAL FIELD

The present invention relates to a position detection device to detect a position of a moving member that moves back and forth (i.e., reciprocating motion) in a predetermined moving direction.

BACKGROUND OF THE INVENTION

Conventionally, position detection devices to detect a position of a moving member which moves back and forth in a predetermined moving direction are used in various fields such as industrial machinery and automobiles.

The electromagnetic induction linear scale (i.e., linear encoder) described in Patent Literature 1 has a coil array composed of a predetermined number of coil elements excited by a first AC signal, a magnetic member that relatively displaces along an axis of the coil array on the outer side of the coil array, and a detection unit that detects a position of the magnetic member relative to the coil array based on output voltages of respective coil elements. The magnetic member causes changes in the amplitude of the output voltages of the coil elements according to the positional relationship with the coil elements. The detection unit detects the position of the magnetic member relative to the coil array in absolute terms based on a phase difference between the first AC signal and a second AC signal which is obtained by synthesizing differential outputs between the coil elements.

CITATION LIST

Patent Literature 1: JP2009-2770A

SUMMARY OF THE INVENTION

In the electromagnetic induction linear scale described in Patent Literature 1, a large number of coil elements need to be lined up over the entire movement range of the magnetic member, which causes an increase in the installation size and weight. Therefore, it is an object of the invention to provide a position detection device that can be reduced in size and weight.

To achieve the object described above, one aspect of the invention provides a position detection device configured to detect a position of a moving member that moves back and forth in a predetermined moving direction, the position detection device comprising:
- an exciting coil arranged to extend in the moving direction along the moving member;
- a detection coil that, by a magnetic field generated by the exciting coil, outputs a voltage corresponding to a position of a detection object portion moving together with the moving member within a predetermined detection range in the moving direction; and
- a calculation unit that determines the position of the moving member by calculation based on an output voltage of the detection coil, wherein the detection object portion has a predetermined length in the moving direction, and a voltage is generated in the detection coil due to a difference in magnetic field intensity between a portion corresponding to the detection object portion and a portion not corresponding to the detection object portion, and wherein during movement of the moving member in one direction, the output voltage of the detection coil changes sinusoidally over the entire period between when the detection coil and at least a portion of the detection object portion begin to line up in a direction perpendicular to the moving direction and when the entire detection object portion becomes out of alignment with the detection coil in the direction perpendicular to the moving direction.

Advantageous Effects of the Invention

According to the invention, it is possible to reduce the size and weight of a position detection device.

DETAILED DESCRIPTION OF THE INVENTION

Embodiment

Figure 1:
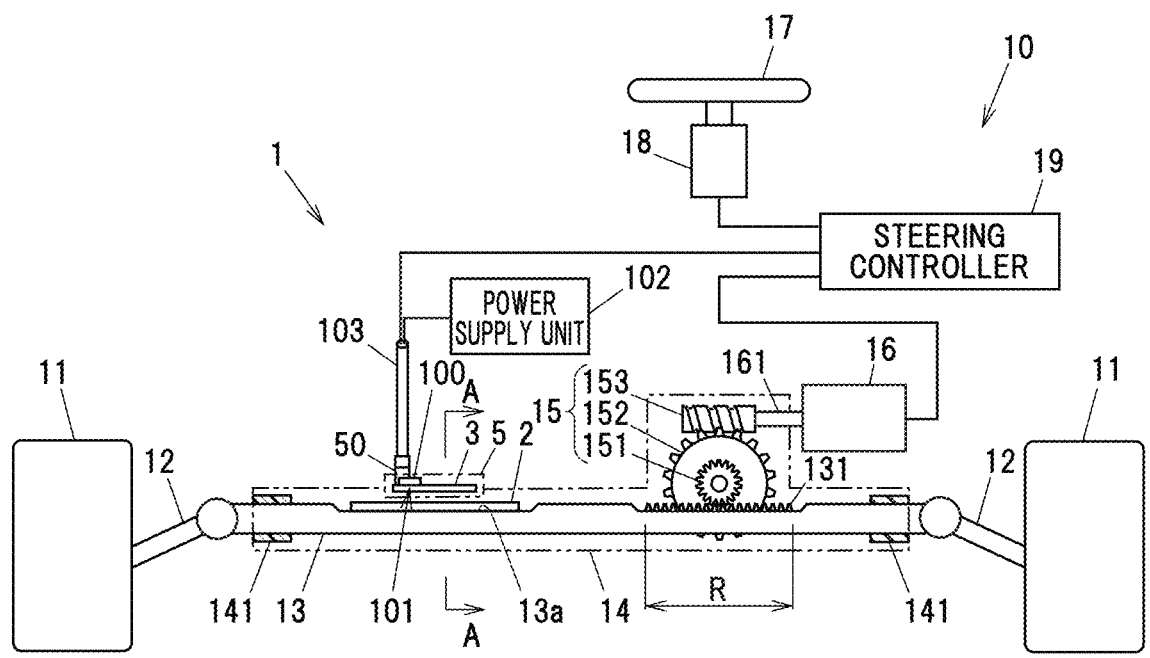
FIG. 1 is a schematic diagram illustrating a vehicle on which a steer-by-wire steering system including a stroke sensor as a position detection device in an embodiment of the present invention is mounted.

FIG. 1 is a schematic diagram illustrating a vehicle on which a steer-by-wire steering system 10 including a stroke sensor 1 as a position detection device in an embodiment of the invention is mounted. In FIG. 1, the steering system 10 is viewed from the rear side in a vehicle front-rear direction, the right side of the drawing corresponds to the right side in a vehicle width direction, and the left side of the drawing corresponds to the left side in the vehicle width direction. The terms "right" and "left" are sometimes used in the following description with reference to the drawings, but this expression is used for convenience of explanation and does not limit the direction of arrangement when the stroke sensor 1 is actually in use.

As shown in FIG. 1, the steering system 10 includes the stroke sensor 1, tie rods 12 connected to steered wheels 11 (left and right front wheels), a rack shaft 13 connected to the tie rods 12, a cylindrical housing 14 that houses the rack shaft 13, a worm speed reduction mechanism 15 having a pinion gear 151 meshed with rack teeth 131 of the rack shaft 13, an electric motor 16 that applies a moving force in a vehicle width direction to the rack shaft 13 through the worm speed reduction mechanism 15, a steering wheel 17 operated by a driver, a steering angle sensor 18 to detect a steering angle of the steering wheel 17, and a steering controller 19 that controls the electric motor 16 based on the steering angle detected by the steering angle sensor 18.

The rack shaft 13 is a moving member whose position relative to the housing 14 is detected by the stroke sensor 1. A moving direction of the rack shaft 13 is an axial direction parallel to a central axis C of the rack shaft 13.

In FIG. 1, the housing 14 is indicated by a phantom line. The rack shaft 13 is supported by a pair of rack bushings 141 attached to both ends of the housing 14. The worm speed reduction mechanism 15 has a worm wheel 152 and a worm gear 153, and the pinion gear 151 is fixed to the worm wheel 152. The worm gear 153 is fixed to a motor shaft 161 of the electric motor 16.

The electric motor 16 generates torque by a motor current supplied from the steering controller 19 and rotates the worm wheel 152 and the pinion gear 151 through the worm gear 153. When the pinion gear 151 rotates, the rack shaft 13 linearly moves back and forth along the vehicle width direction, and the left and right steered wheels 11 are steered. The rack shaft 13 can move to the right and left in the vehicle width direction within a predetermined range from a neutral position at which the steering angle is zero.

In FIG. 1, a double-headed arrow indicates a stroke range R that corresponds to the maximum travel distance of the rack shaft 13 when the steering wheel 17 is operated from one of the left and right maximum steering angles to the other maximum steering angle. The stroke sensor 1 can detect the absolute position of the rack shaft 13 relative to the housing 14 over the entire stroke range R.

The stroke sensor 1 includes a target 2 which is a conductive member attached to the rack shaft 13, a substrate 3 arranged so as to face the target 2, a calculation unit 101 composed of a CPU (central processing unit) 100 mounted on the substrate 3, a case member 5 having a connector 50, a power supply unit 102 that generates a high-frequency voltage, and a cable 103 to connect the connector 50, which is attached to the case member 5, to the power supply unit 102 and the steering controller 19. The substrate 3 is housed in the case member 5, is arranged parallel to the rack shaft 13, and is fixed so as not to be movable relative to the housing 14.

The stroke sensor 1 detects a position of the rack shaft 13 in the axial direction (the moving direction) relative to the housing 14 and outputs information of the detected position to the steering controller 19 through the cable 103. The steering controller 19 controls the electric motor 16 in such a manner that the position of the rack shaft 13 detected by the stroke sensor 1 corresponds to the steering angle of the steering wheel 17 detected by the steering angle sensor 18.

Figure 2:
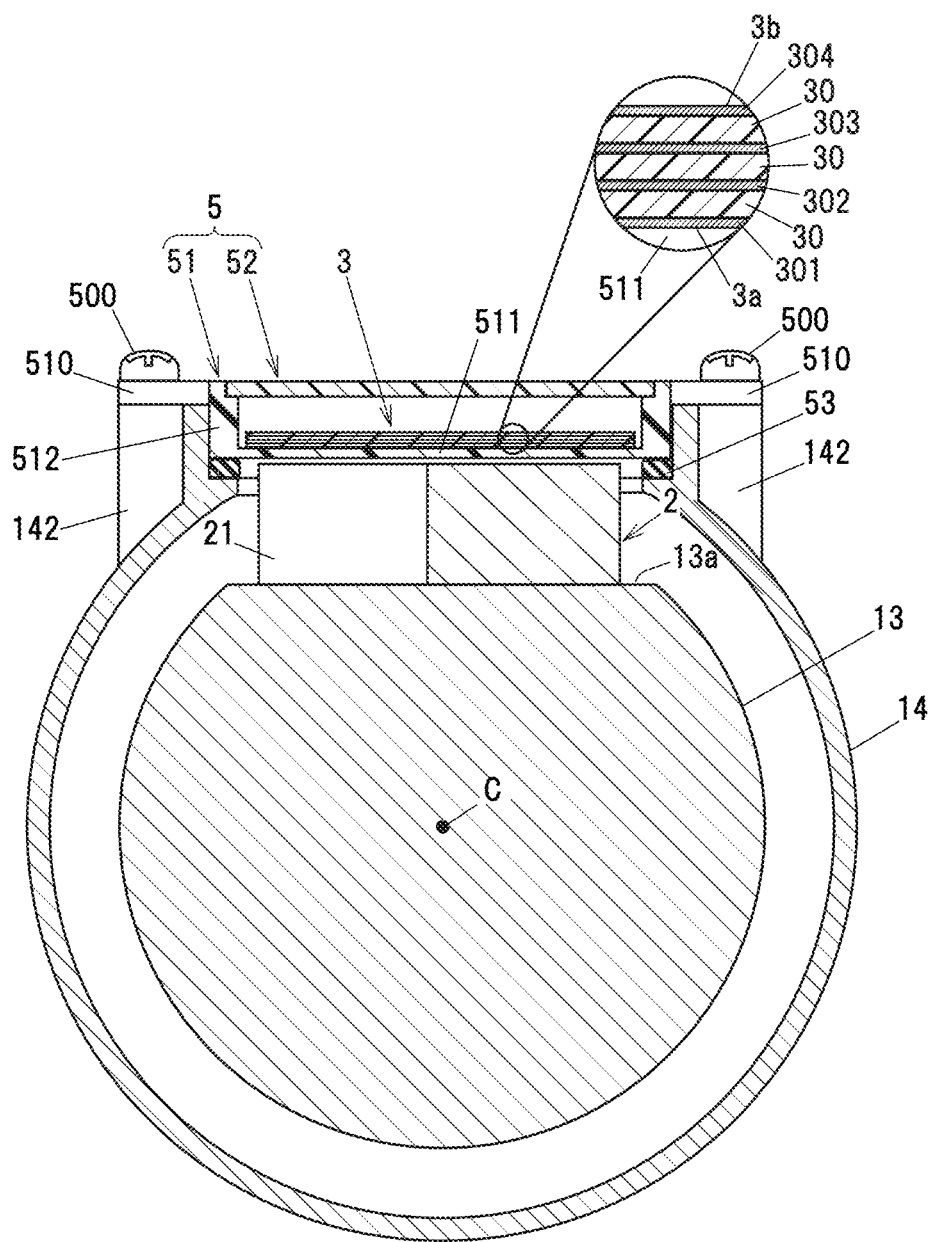
FIG. 2 is a cross-sectional view taken along a line A-A in FIG. 1.
Figure 3:
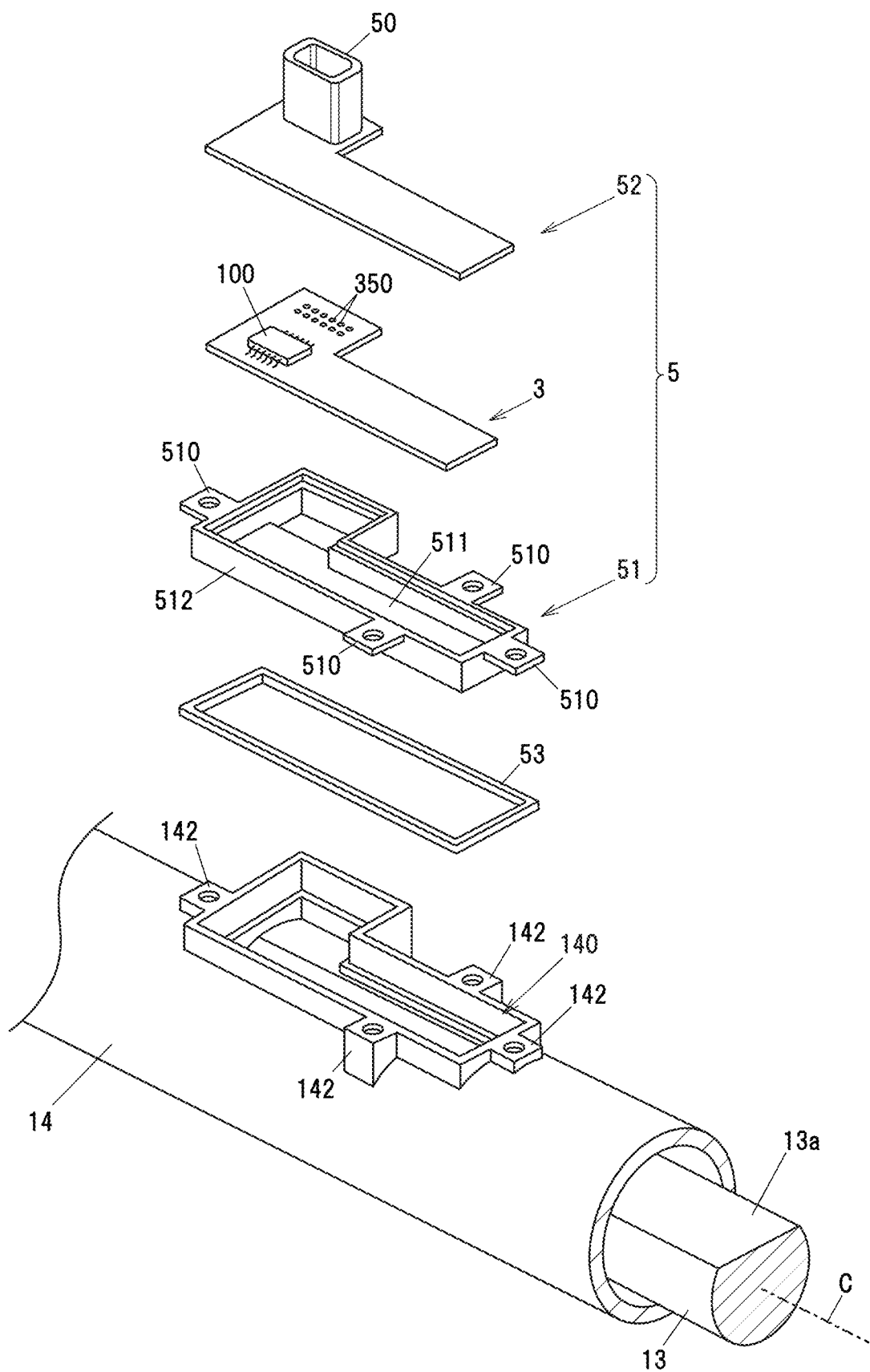
FIG. 3 is a perspective view showing a substrate, a CPU, a case member, and portions of a rack shaft and a housing.
Figure 4A:
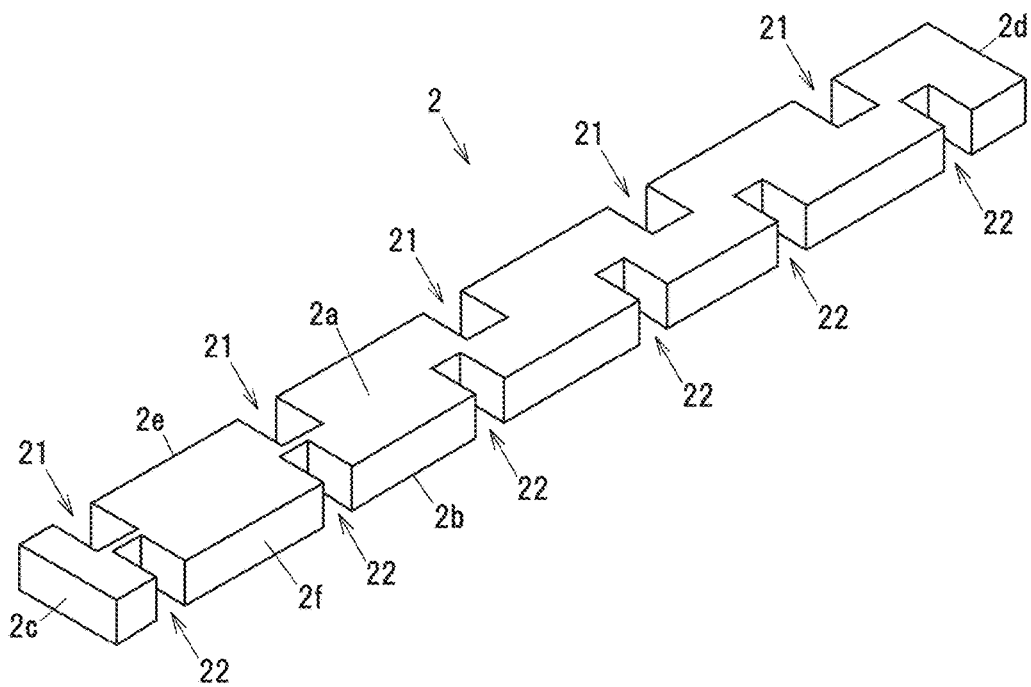
FIG. 4A is a perspective view showing a target.
Figure 4B:
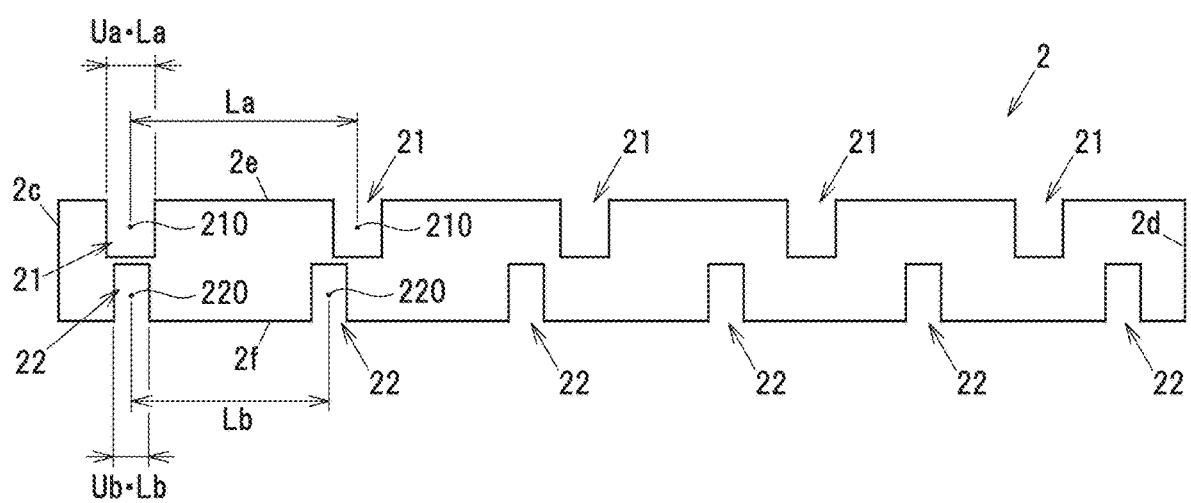
FIG. 4B is a plan view showing the target.

FIG. 2 is a cross-sectional view taken along line A-A in FIG. 1. FIG. 3 is a perspective view showing the substrate 3, the CPU 100, the case member 5, and portions of the rack shaft 13 and the housing 14. FIG. 4A is a perspective view showing the target 2, and FIG. 4B is a plan view showing the target 2.

The rack shaft 13 is a rod-shaped body made of, e.g., steel such as carbon steel for machine structural use. The housing 14 is made of, e.g., a die-cast cylindrical aluminum alloy. The housing 14 has an opening 140 that opens upward in the vertical direction, and the case member 5 is attached so as to close the opening 140.

The case member 5 has a case main body 51 and a case lid 52. Plural fixing portions 510 for fixing to the housing 14 are provided on the case main body 51, and these fixing portions 510 are fixed by bolts 500 (see FIG. 2) to fixing-target portions 142 provided on the housing 14. A packing 53 to prevent water from entering through the opening 140 of the housing 14 is arranged between the case main body 51 and the housing 14. The case main body 51 and the case lid 52 are made of, e.g., a resin material which is an insulator, but one or both of the case main body 51 and the case lid 52 may be conductors.

The case main body 51 has a bottom plate 511 facing a front surface 3a of the substrate 3, and a perimeter sidewall 512 provided around the bottom plate 511. The substrate 3 is arranged between the bottom plate 511 of the case main body 51 and the case lid 52. The case lid 52 is fixed to an open end of the perimeter sidewall 512 by, e.g., adhesion. The connector 50 is attached to the case lid 52.

The substrate 3 is a four-layered substrate in which plate-shaped bases 30 made of a dielectric such as FR4 (glass fiber impregnated with epoxy resin and heat-cured) are arranged between first to fourth metal layers 301 to 304. A thickness of each base 30 is, e.g., 0.3 mm. The first to fourth metal layers 301 to 304 are made of, e.g., copper and each have a thickness of, e.g., 18 μm. The substrate 3 has a flat rectangular shape whose long side direction (longitudinal direction) coincides with the moving direction of the rack shaft 13. The substrate 3 is not limited to a rigid substrate and may be a flexible substrate.

The target 2 has a long plate shape as a whole and is fixed to the rack shaft 13 in such a manner that its longitudinal direction is parallel to the rack shaft 13. The target 2 has a facing surface 2a parallel to the substrate 3, an attachment surface 2b to be attached to the rack shaft 13, end surfaces 2c and 2d located at ends in the longitudinal direction, and one and other side surfaces 2e and 2f located on sides in a lateral direction. The facing surface 2a of the target 2 faces the bottom plate 511 of the case main body 51 with a small gap therebetween. In this regard, the facing surface 2a of the target 2 may directly face the front surface 3a of the substrate 3.

The target 2 has plural first detection object portions 21 formed along the one side surface 2e and plural second detection object portions 22 formed along the other side surface 2f, and the first detection object portions 21 and the second detection object portions 22 move together with the rack shaft 13. The first detection object portion 21 and the second detection object portion 22 respectively have predetermined lengths in the moving direction of the rack shaft 13. The shapes of the first detection object portion 21 and the second detection object portion 22 when viewed from the facing surface 2a side are rectangular shapes.

The material of the target 2 desirably has high conductivity and, e.g., an aluminum alloy or copper alloy can be suitably used. A flat attachment surface 13a for attachment of the target 2 is formed on the rack shaft 13, and the target 2 is fixed to the attachment surface 13a by, e.g., welding. In this regard, plural detection object portions may be formed on the rack shaft 13 by machining the shaft material.

The first detection object portions 21 and the second detection object portions 22 are formed as recesses that are recessed from the facing surface 2a toward the rack shaft 13. In the present embodiment, the first detection object portions 21 and the second detection object portions 22 penetrate between the facing surface 2a and the attachment surface 2b in a thickness direction of the target 2. The first detection object portions 21 are open on the one side surface 2e, and the second detection object portions 22 are open on the other side surface 2f. In the present embodiment, five first detection object portions 21 and six second detection object portions 22 are formed at equal intervals along the longitudinal direction of the target 2.

Figure 5:
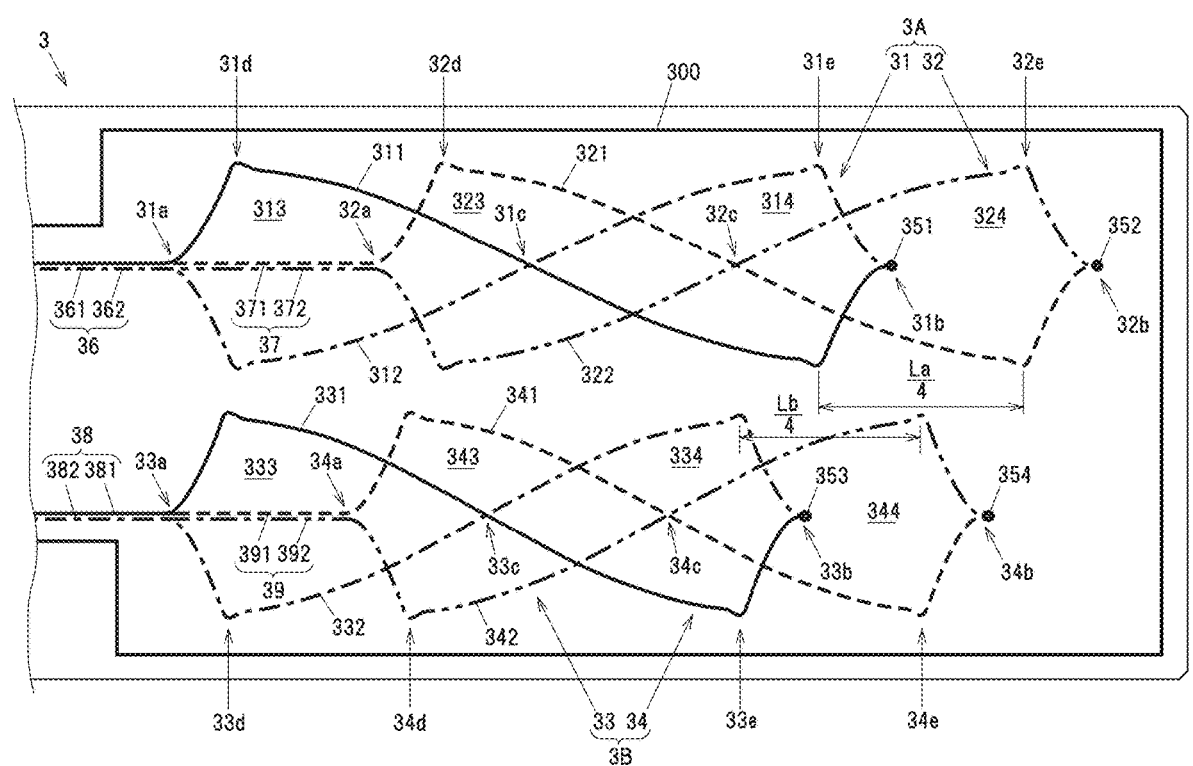
FIG. 5 is an explanatory diagram illustrating wiring patterns formed on first to fourth metal layers of the substrate as seen through from a back surface side.

FIG. 5 is an explanatory diagram illustrating wiring patterns formed on the first to fourth metal layers 301 to 304 of the substrate 3 as seen through from a back surface 3b side. FIGS. 6A to 6D are plan views respectively showing the first to fourth metal layers 301 to 304 when viewed from the back side.

In FIGS. 5 and 6A to 6D, the wiring pattern of the first metal layer 301 is indicated by solid lines, the wiring pattern of the second metal layer 302 is indicated by dashed lines, the wiring pattern of the third metal layer 303 is indicated by dashed-dotted lines, and the wiring pattern of the fourth metal layer 304 is indicated by dashed-double-dotted lines.

Plural through-holes 350 (see FIG. 3) to connect terminals of the connector 50 and first to fourth vias 351 to 354 for inter-layer connection of the wiring pattern of each layer are formed on the substrate 3. In addition, the CPU 100 is mounted on the back surface 3b of the substrate 3. The CPU 100 has a calculation processing function of executing calculation processing according to a program and also has an AD conversion (analog-digital conversion) function.

First to fourth detection coils 31 to 34 to detect the position of the target 2 and first to fourth transmission lines 36 to 39 to transmit respective output voltages of the first to fourth detection coils 31 to 34 to the calculation unit 101 are formed on the substrate 3. The first detection coil 31 and the second detection coil 32 constitute a first detection coil set 3A, and the third detection coil 33 and the fourth detection coil 34 constitute a second detection coil set 3B.

Figure 6A:
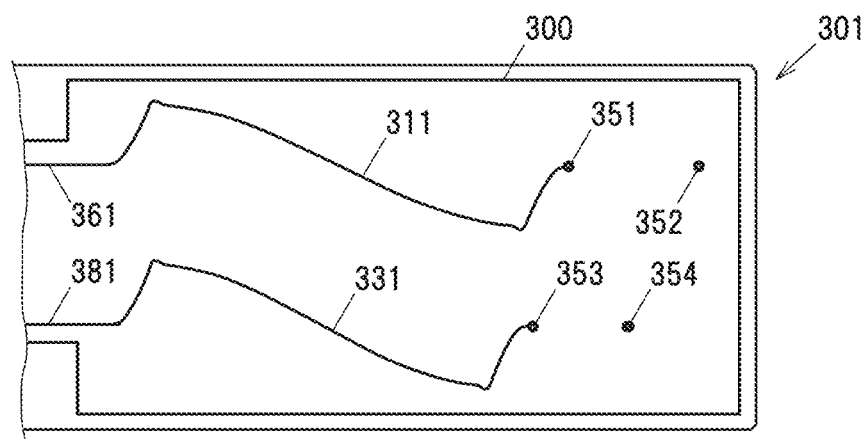
FIGS. 6A to 6D are plan views respectively showing the first to fourth metal layers when viewed from the back surface side.
Figure 6B:
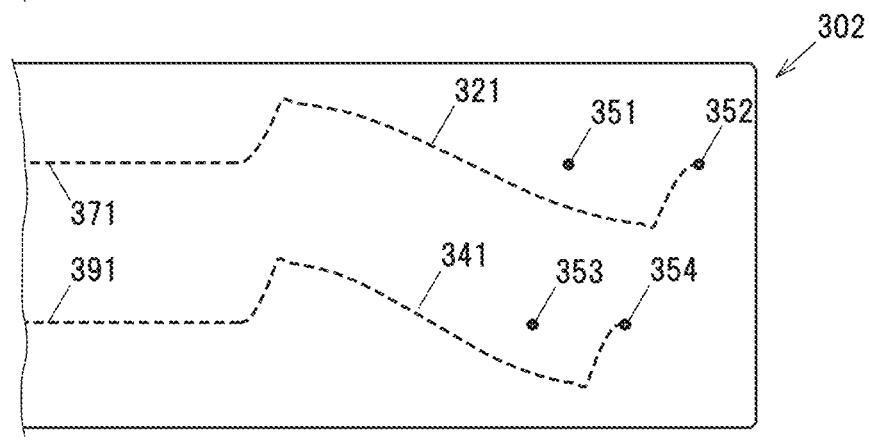

An exciting coil 300 arranged to extend in the axial direction of the rack shaft 13 along the rack shaft 13 is also formed on the substrate 3 so as to surround the first to fourth detection coils 31 to 34. In the present embodiment, the exciting coil 300 is formed on the first metal layer 301, as shown in FIG. 6A. The exciting coil 300 may be formed across plural metal layers among the first to fourth metal layers 301 to 304.

The first detection coil set 3A and the second detection coil set 3B are arranged side by side in a direction perpendicular to an extending direction of the exciting coil 300 (arranged in the lateral direction of the substrate 3). The plural first detection object portions 21 of the target 2 are provided so as to correspond to the first detection coil set 3A, and the plural second detection object portions 22 are provided so as to correspond to the second detection coil set 3B. That is, when the substrate 3 is viewed from the back surface 3b side, the first detection coil set 3A and the first detection object portion 21 overlap in a direction perpendicular to the substrate 3, and the second detection coil set 3B and the second detection object portion 22 overlap in the direction perpendicular to the substrate 3. Hereafter, the direction perpendicular to the substrate 3 is referred to as the substrate normal direction. The substrate normal direction is a direction perpendicular to the moving direction of the rack shaft 13.

By a magnetic field generated by the exciting coil 300, the first to fourth detection coils 31 to 34 output voltages corresponding to the positions of the plural first and second detection object portions 21 and 22 of the target 2 within a predetermined detection range in the moving direction of the rack shaft 13. The CPU 100 determines the position of the rack shaft 13 by calculation based on output voltages of the first to fourth detection coils 31 to 34.

Figure 6C:
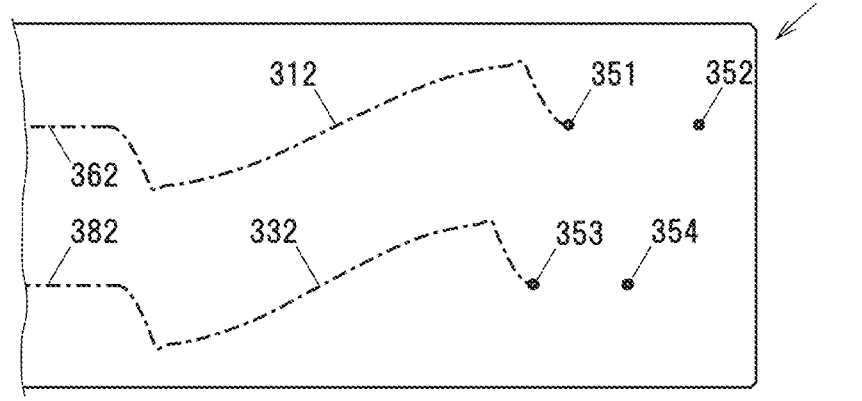
Figure 6D:
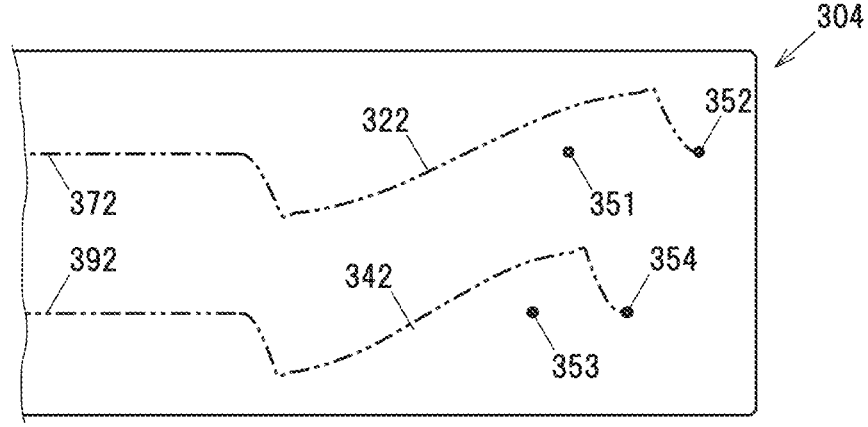
Figure 7:
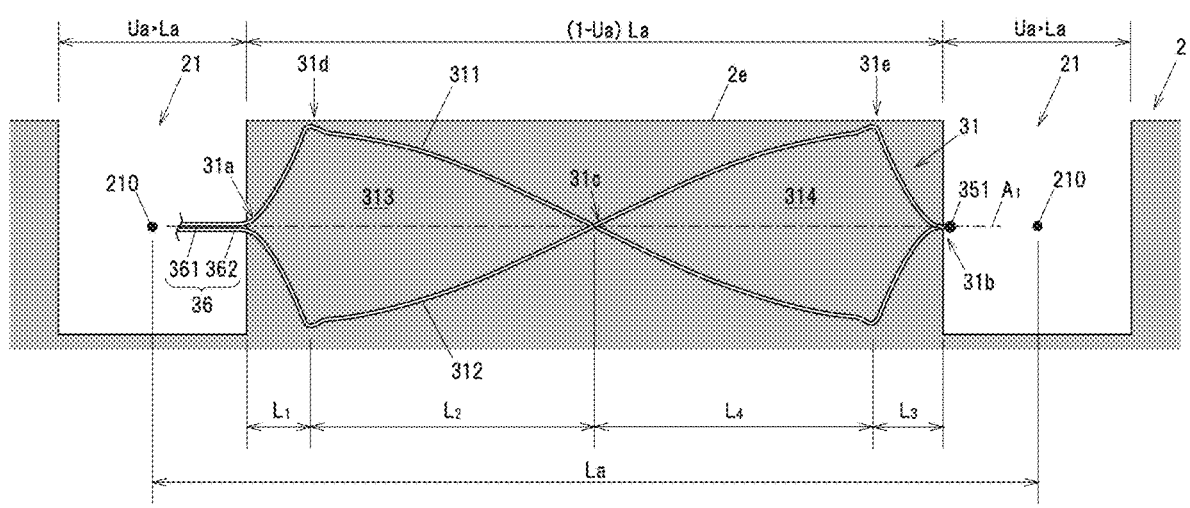
FIG. 7 is an explanatory diagram illustrating a first detection coil together with two first detection object portions of the target.

FIG. 7 is an explanatory diagram illustrating the first detection coil 31 together with two first detection object portions 21 of the target 2. In FIGS. 5 to 7, the left-right direction of the drawing corresponds to the longitudinal direction of the substrate 3 and the up-down direction of the drawing corresponds to the lateral direction of the substrate 3. The terms "left", "right", "up/upper" and "down/lower" in the following description are used for convenience of explanation and indicate the respective directions in FIGS. 5 to 7.

In FIG. 7, La denotes a distance in the longitudinal direction of the target 2 between respective center points 210 of the two first detection object portions 21, and Ua denotes a ratio of the length of the first detection object portion 21 to this distance La. A length of the first detection coil 31 in the longitudinal direction of the substrate 3 is $(1-Ua)La$. A distance between the two first detection object portions 21 aligned in the longitudinal direction of the substrate 3 is the same as the length of the first detection coil 31. In the present embodiment, Ua is 0.25, and the length of the first detection object portion 21 in the longitudinal direction of the substrate 3 is one-quarter of the distance La.

The first detection coil 31 has two coil conductor portions 311 and 312 that are spaced apart in a coil width direction (the up-down direction in FIG. 7) perpendicular to the extending direction of the exciting coil 300. A distance between the two coil conductor portions 311 and 312 in the coil width direction is smallest at both end portions 31a and 31b of the first detection coil 31. The first detection coil 31 also has an intersection portion 31c at which the two coil conductor portions 311 and 312 intersect, and a left maximum portion 31d and a right maximum portion 31e at which the distance between the two coil conductor portions 311 and 312 in the coil width direction is largest between the intersection portion 31c and the two end portions 31a and 31b.

The first detection coil 31 has a symmetrical shape in which a left portion and a right portion are symmetrical with respect to the intersection portion 31c. Hereinafter, a region between the two coil conductor portions 311 and 312 on the left side of the intersection portion 31c is referred to as a left window portion 313, and a region between the two coil conductor portions 311 and 312 on the right side of the intersection portion 31c is referred to as a right window portion 313.

The distance between the two coil conductor portions 311 and 312 gradually increases from the left end portion 31a of the first detection coil 31 toward the left maximum portion 31d, and gradually decreases from the left maximum portion 31d toward the intersection portion 31c. Likewise, the distance between the two coil conductor portions 311 and 312 gradually increases from the right end portion 31b of the first detection coil 31 toward the right maximum portion 31e and gradually decreases from the right maximum portion 31e toward the intersection portion 31c.

When distinguishing the two coil conductor portions 311 and 312 in the following description of the present embodiment, the coil conductor portion 311, which is located on the upper side of the drawing than the intersection portion 31c in a section between the intersection portion 31c and the left end portion 31a as well as on the lower side of the drawing than the intersection portion 31c in a section between the intersection portion 31c and the right end portion 31b, is referred to as one coil conductor portion 311, and the coil conductor portion 312, which is located on the lower side of the drawing than the intersection portion 31c in the section between the intersection portion 31c and the left end portion 31a as well as on the upper side of the drawing than the intersection portion 31c in the section between the intersection portion 31c and the right end portion 31b, is referred to as the other coil conductor portion 312.

The one coil conductor portion 311 is formed on the first metal layer 301, as shown in FIG. 6A. The other coil conductor portion 312 is formed on the third metal layer 303, as shown in FIG. 6C. The one coil conductor portion 311 and the other coil conductor portion 312 are symmetrical in the lateral direction of the substrate 3 with respect to a symmetry axis $A_1$ that extends in the longitudinal direction of the substrate 3. The one coil conductor portion 311 and the other coil conductor portion 312 are electrically connected through the first via 351 at the right end portion 31b of the first detection coil 31.

The one coil conductor portion 311 and the other coil conductor portion 312 are inclined such that an inclination with respect to the longitudinal direction of the substrate 3 (the moving direction of the rack shaft 13) between the left end portion 31a of the first detection coil 31 and the left maximum portion 31d is greater than an inclination with respect to the longitudinal direction of the substrate 3 between the left maximum portion 31d and the intersection portion 31c. In addition, the one coil conductor portion 311 and the other coil conductor portion 312 are inclined such that an inclination with respect to the longitudinal direction of the substrate 3 between the right end portion 31b of the first detection coil 31 and the right maximum portion 31e is greater than an inclination with respect to the longitudinal direction of the substrate 3 between the right maximum portion 31e and the intersection portion 31c.

In the first detection coil 31, due to the above-described difference in inclination between the portions of the coil conductor portions 311 and 312, a distance $L_1$ in the longitudinal direction of the substrate 3 from the left end portion 31a of the first detection coil 31 to the left maximum portion 31d is shorter than a distance $L_2$ from the left maximum portion 31d to the intersection portion 31c, and a distance $L_3$ from the right end portion 31b of the first detection coil 31 to the right maximum portion 31e is shorter than a distance $L_4$ from the right maximum portion 31e to the intersection portion 31c.

The exciting coil 300 generates a magnetic field when a current is supplied from the power supply unit 102. An eddy current is generated in the target 2 due to the magnetic field generated by the exciting coil 300. This eddy current acts to weaken the strength of the magnetic field in the substrate 3, which causes variation in the magnetic field strength distribution in the substrate 3. That is, the strength of the magnetic field on the substrate 3 is strong at a portion lining up in the substrate normal direction with the first detection object portion 21 or the second detection object portion 22 of the target 2, and the strength of the magnetic field on the substrate 3 is relatively weak at a portion lining up in the substrate normal direction with a portion of the target 2 at which the first detection object portion 21 or the second detection object portion 22 is not formed.

Voltage corresponding to the position of the plural first detection object portions 21 relative to the substrate 3 is generated in the first detection coil 31 due to a difference in magnetic field strength between a portion corresponding to the first detection object portion 21 (a portion lining up in the substrate normal direction with the first detection object portion 21) and a portion not corresponding to the first detection object portion 21 (a portion not lining up in the substrate normal direction with the first detection object portion 21). That is, when there is no variation in the magnetic field strength distribution on the substrate 3, an electromotive force due to a magnetic flux linking with the left window portion 313 and an electromotive force due to a magnetic flux linking with the right window portion 314 cancel each other out and the voltage generated in the first detection coil 31 is thus zero. However, in the present embodiment, a difference occurs between the electromotive force due to the magnetic flux linking with the left window portion 313 and the electromotive force due to the magnetic flux linking with the right window portion 314 because of the difference in magnetic field strength between the portion corresponding to the first detection object portion 21 and the portion not corresponding to the first detection object portion 21, and this difference in electromotive force is the output voltage of the first detection coil 31. During when the rack shaft 13 is moving, the area of the portion at which the left window portion 313 and the right window portion 314 line up with the plural detection object portions 21 in the substrate normal direction changes and a magnitude of the output voltage of the first detection coil 31 thus changes periodically.

The shape of the first detection coil 31 described above is designed in such a manner that during movement of the moving member in one direction, the output voltage of the detection coil 31 changes sinusoidally over the entire period between when the detection coil 31 and at least a portion of the detection object portion 21 begin to line up in the substrate normal direction and when the entire portion of this detection object portion 21 becomes out of alignment in the substrate normal direction with the detection coil 31. The details of the change in the output voltage of the first detection coil 31 according to the position of the rack shaft 13 will be described later.

The voltage generated in the first detection coil 31 is transmitted to the calculation unit 101 through the first transmission line 36. The first transmission line 36 has a one-side conductor wire 361 connected to the one coil conductor portion 311 at the left end portion 31a of the first detection coil 31, and an other-side conductor wire 362 connected to the other coil conductor portion 312 at the left end portion 31a of the first detection coil 31. The one-side conductor wire 361, together with the one coil conductor portion 311, is formed on the first metal layer 301, and the other-side conductor wire 362, together with the other coil conductor portion 312, is formed on the third metal layer 303.

Figure 8:
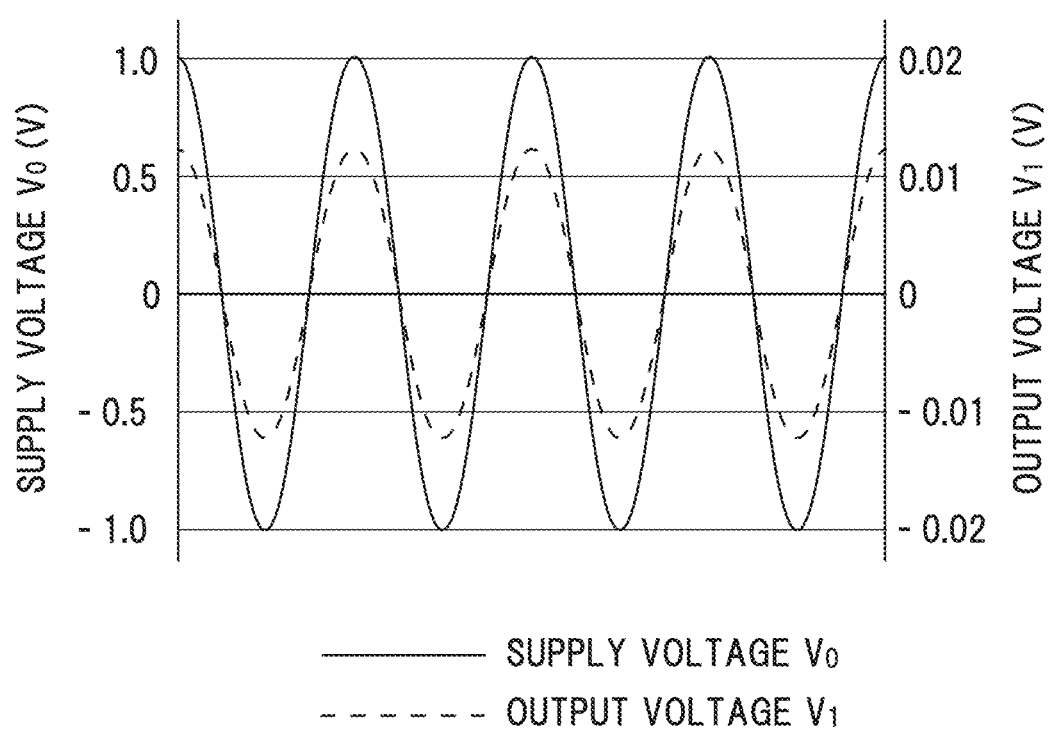
FIG. 8 is a graph showing an example of a relationship between supply voltage supplied from a power supply unit to an exciting coil and output voltage of the first detection coil.

FIG. 8 is a graph showing an example of a relationship between supply voltage $V_0$ supplied from the power supply unit 102 to the exciting coil 300 and output voltage $V_1$ of the first detection coil 31. In the graph of FIG. 8, the horizontal axis is the time axis, and the left and right vertical axes indicate the supply voltage $V_0$ and the output voltage $V_1$. A high-frequency AC voltage of, e.g., about 1 MHz is supplied as the supply voltage $V_0$ to the exciting coil 300. The supply voltage $V_0$ and the output voltage $V_1$ are in phase with each other in the example shown in FIG. 6, but the output voltage $V_1$ switches between in-phase and antiphase at the time that the center point 210 of the first detection object portion 21 passes through the position corresponding to the intersection portion 31c.

The second detection coil 32 is offset from the first detection coil 31 in the extending direction of the exciting coil 300 (the longitudinal direction of the substrate 3). The amount of this offset is La/4 as shown in FIG. 5. The shape and size of the second detection coil 32 are the same as the shape and size of the first detection coil 31. That is, the second detection coil 32 has two coil conductor portions 321 and 322 spaced apart in the coil width direction, and the distance between the two coil conductor portions 321 and 322 in the coil width direction is smallest at both end portions 32a and 32b of the second detection coil 32.

The second detection coil 32 also has an intersection portion 32c at which the two coil conductor portions 321 and 322 intersect, and a left maximum portion 32d and a right maximum portion 32e at which the distance between the two coil conductor portions 321 and 322 in the coil width direction is largest respectively between the intersection portion 31c and the end portion 32a and between the intersection portion 31c and the end portion 32b. A region between the two coil conductor portions 321 and 322 on the left side of the intersection portion 32c is a left window portion 323. A region between the two coil conductor portions 321 and 322 on the right side of the intersection portion 32c is a right window portion 324.

Of the two coil conductor portions 321 and 322 of the second detection coil 32, the one coil conductor portion 321 is formed on the second metal layer 302 of the substrate 3 and the other coil conductor portion 322 is formed on the fourth metal layer 304 of the substrate 3. The one coil conductor portion 321 and the other coil conductor portion 322 are electrically connected through the second via 352 at the right end portion 32b of the second detection coil 32.

The second detection coil 32 outputs a voltage corresponding to the position of the target 2 relative to the substrate 3, in the same manner as the first detection coil 31. The voltage generated in the second detection coil 32 is transmitted to the calculation unit 101 through the second transmission line 37. The second transmission line 37 has a one-side conductor wire 371 connected to the one coil conductor portion 321 at the left end portion 32a, and an other-side conductor wire 372 connected to the other coil conductor portion 322 at the left end portion 32a. The one-side conductor wire 371, together with the one coil conductor portion 321, is formed on the second metal layer 302, and the other-side conductor wire 372, together with the other coil conductor portion 322, is formed on the fourth metal layer 404.

Figure 9:
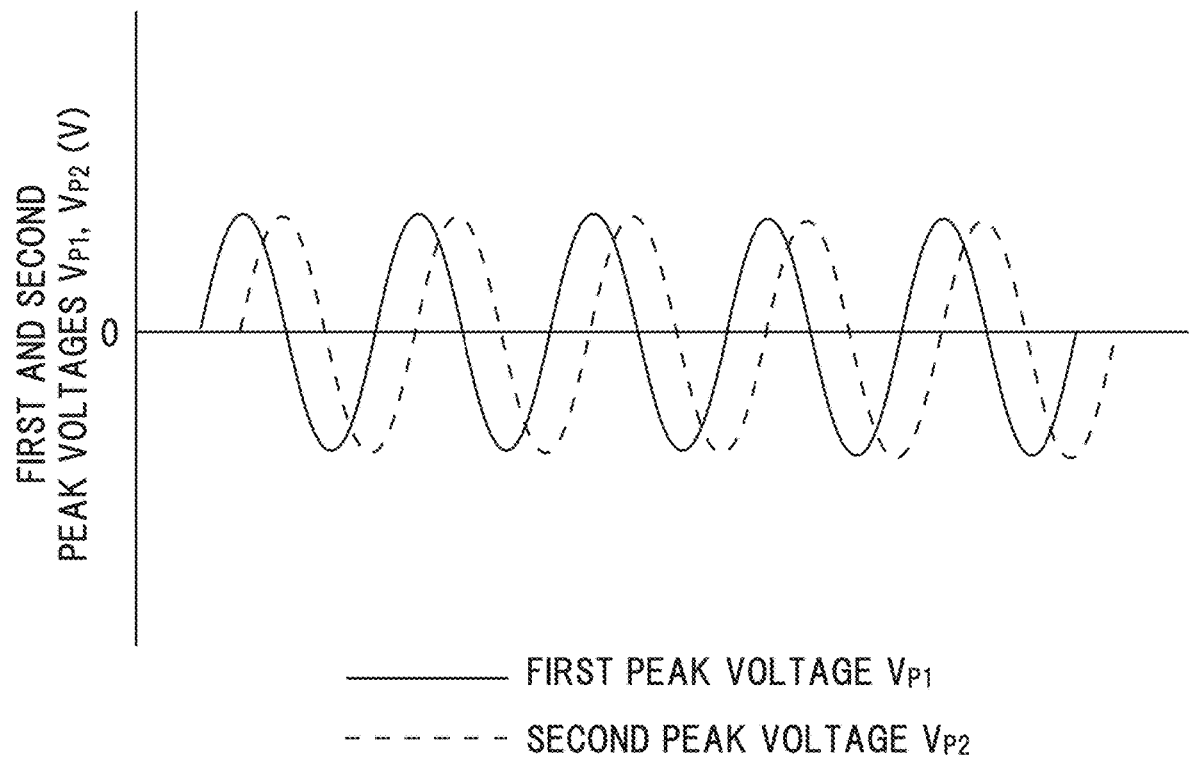
FIG. 9 is a graph showing a relationship between peak voltage of the first detection coil in one cycle of the supply voltage supplied to the exciting coil and peak voltage of the second detection coil in one cycle of the supply voltage, when the rack shaft moves in one direction at a constant speed.

FIG. 9 is a graph showing a relationship between first peak voltage $V_{P1}$, which is the absolute maximum value of the output voltage of the first detection coil 31 in one cycle of the supply voltage supplied to the exciting coil 300, and second peak voltage $V_{P2}$, which is the absolute maximum value of the output voltage of the second detection coil 32 in one cycle of the supply voltage $V_0$, when the rack shaft 13 moves in one direction at a constant speed. In this graph, the first peak voltage $V_{P1}$ has a positive value when the output voltage of the first detection coil 31 is in phase with the supply voltage, and has a negative value when in antiphase. Likewise, the second peak voltage $V_{P2}$ has a positive value when the output voltage of the second detection coil 32 is in phase with the supply voltage, and has a negative value when in antiphase.

The first peak voltage $V_{P1}$ and the second peak voltage $V_{P2}$ change sinusoidally for cycles corresponding to the number of the first detection object portions 21 formed on the target 2. In the present embodiment, since the five first detection object portions 21 are formed at equal intervals along the longitudinal direction of the target 2, the first peak voltage $V_{P1}$ and the second peak voltage $V_{P2}$ change for five cycles. In addition, since the second detection coil 32 is offset from the first detection coil 31 by a length of La/4, the second peak voltage $V_{P2}$ is 90° ($\pi/2$ [rad]) out of phase from the first peak voltage $V_{P1}$. Therefore, the CPU 100 can determine the position Xa of the rack shaft 13 in the range of the distance La corresponding to one cycle of the first peak voltage $V_{P1}$ by the following equation (1).

$$Xa = L \frac{\tan^{-1}\left(\frac{V_{P2}}{V_{P1}}\right)}{2\pi} \quad (1)$$

For the calculation processing of $\tan^{-1}$ (arc tangent), the calculation load can be reduced by referring to, e.g., a sequence (a lookup table) stored in a nonvolatile memory element.

However, by the calculation using this equation (1) alone, it is not possible to determine which of the five first detection object portions 21 is located at a position corresponding to the first detection coil 31 and the second detection coil 32 and it is not possible to detect its absolute position over the entire stroke range R of the rack shaft 13. Therefore, the stroke sensor 1 has the second detection coil set 3B composed of a combination of the third detection coil 33 and the fourth detection coil 34, in addition to the first detection coil set 3A composed of a combination of the first detection coil 31 and the second detection coil 32. The third detection coil 33 and the fourth detection coil 34 are configured in a similar manner to the first detection coil 31 and the second detection coil 32.

As shown in FIG. 5, the third detection coil 33 has two coil conductor portions 331 and 332, and the distance between the two coil conductor portions 331 and 332 in the coil width direction is smallest at both end portions 33a and 33b of the third detection coil 33. The third detection coil 33 also has an intersection portion 33c at which the two coil conductor portions 331 and 332 intersect, and a left maximum portion 33d and a right maximum portion 33e. A region between the two coil conductor portions 331 and 332 on the left side of the intersection portion 33c is a left window portion 333. A region between the two coil conductor portions 331 and 332 on the right side of the intersection portion 33c is a right window portion 334.

Likewise, the fourth detection coil 34 has two coil conductor portions 341 and 342, and the distance between the two coil conductor portions 341 and 342 in the coil width direction is smallest at both end portions 34a and 34b of the fourth detection coil 34. The fourth detection coil 34 also has an intersection portion 34c at which the two coil conductor portions 341 and 342 intersect, and a left maximum portion 34d and a right maximum portion 34e. A region between the two coil conductor portions 341 and 342 on the left side of the intersection portion 34c is a left window portion 343, and a region between the two coil conductor portions 341 and 342 on the right side of the intersection portion 34c is a right window portion 344.

The fourth detection coil 34 is offset from the third detection coil 33 by an offset amount of Lb/4 in the extending direction of the exciting coil 300, where Lb is a distance in the longitudinal direction of the target 2 between respective center points 220 of two second detection object portions 22 as shown in FIG. 4B. A ratio of the length of the second detection object portion 22 to the distance Lb is Ub, and in the present embodiment, Ub is 0.25. A length of the third detection coil 33 and a length of the fourth detection coil 34 in the longitudinal direction of the substrate 3 are (1−Ub)Lb.

The coil conductor portion 331 of the third detection coil 33 is formed on the first metal layer 301, the coil conductor portion 332 of the third detection coil 33 is formed on the third metal layer 303, the coil conductor portion 341 of the fourth detection coil 34 is formed on the second metal layer 302, and the coil conductor portion 342 of the fourth detection coil 34 is formed on the fourth metal layer 304. The coil conductor portions 331 and 332 of the third detection coil 33 are electrically connected through the third via 353 at the right end portion 33b of the third detection coil 33, and the coil conductor portions 341 and 342 of the fourth detection coil 34 are electrically connected through the fourth via 354 at the right end portion 34b of the fourth detection coil 34.

The third detection coil 33 and the fourth detection coil 34 output a voltage corresponding to the position of the target 2 relative to the substrate 3, in the same manner as the first detection coil 31 and the second detection coil 32, due to a difference in magnetic field strength between a portion lining up in the substrate normal direction with the second detection object portion 22 and a portion not lining up with the second detection object portion 22. The output voltage of the third detection coil 33 is transmitted to the calculation unit 101 through the third transmission line 38 composed of a one-side conductor wire 381 connected to the one coil conductor portion 331 at the left end portion 33a of the third detection coil 33 and an other-side conductor wire 382 connected to the other coil conductor portion 332. The output voltage of the fourth detection coil 34 is transmitted to the calculation unit 101 through the fourth transmission line 39 composed of a one-side conductor wire 391 connected to the one coil conductor portion 341 at the left end portion 34a of the fourth detection coil 34 and an other-side conductor wire 392 connected to the other coil conductor portion 342.

When the absolute maximum value of the output voltage of the third detection coil 33 in one cycle of the supply voltage supplied to the exciting coil 300 is defined as third peak voltage $V_{P3}$ and the absolute maximum value of the output voltage of the fourth detection coil 34 in one cycle of the supply voltage $V_0$ is defined as fourth peak voltage $V_{P4}$, the CPU 100 can determine the position Xb of the rack shaft 13 in the range of the distance Lb corresponding to one cycle of the third peak voltage $V_{P3}$ by the following equation (2).

$$Xb = L\frac{\tan^{-1}\left(\frac{V_{P3}}{V_{P4}}\right)}{2\pi} \quad (2)$$

The distance Lb in the longitudinal direction of the substrate 3 between respective center points 220 of two second detection object portions 22 is shorter than the distance La in the longitudinal direction of the substrate 3 between respective center points 210 of two first detection object portions 21. A ratio of La to Lb (La/Lb) is greater than 1 and smaller than $n_2/n_1$, where $n_1$ is the number of the first detection object portions 21 formed on the target 2 and $n_2$ is the number of the second detection object portions 22. In the present embodiment, $n_1=5$ and $n_2=6$, hence, La/Lb is less than 1.2, and in the example shown in FIGS. 4 and 5, La/Lb is 1.143. La is 0.040 [m] as an example, and Lb is 0.035 [m] as an example.

In addition, the length of the third detection coil 33 and the length of the fourth detection coil 34 in the longitudinal direction of the substrate 3 are different from the length of the first detection coil 31 and the length of the second detection coil 32 in the longitudinal direction of the substrate 3, where the length of the third detection coil 33 is shorter than the length of the first detection coil 31 and the length of the fourth detection coil 34 is shorter than the length of the second detection coil 32. A ratio of the length of the first detection coil 31 to the length of the third detection coil 33 and a ratio of the length of the second detection coil 32 to the length of the fourth detection coil 34 are the same as the ratio of La to Lb.

Figure 10:
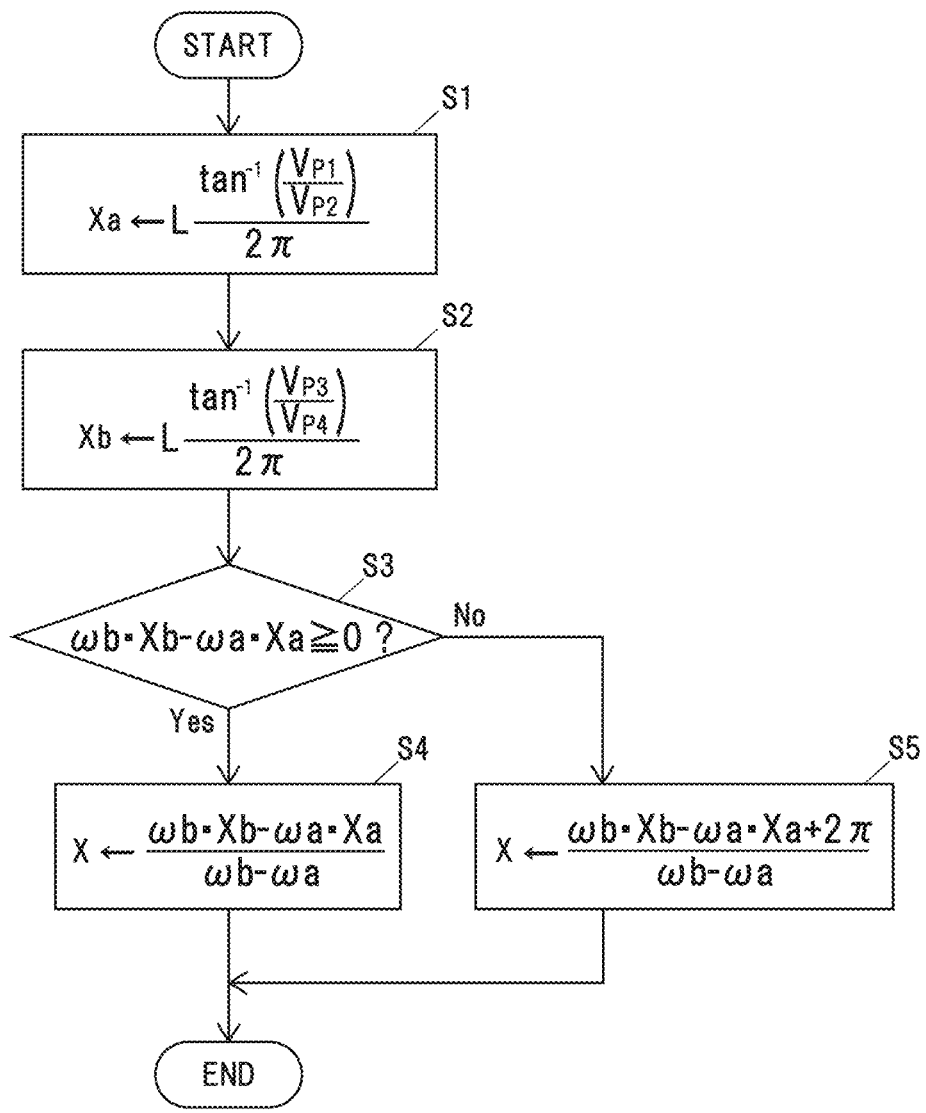
FIG. 10 is a flowchart showing an example of calculation processing performed by the CPU to determine a position of the rack shaft.

FIG. 10 is a flowchart showing an example of calculation processing performed by the CPU 100 to determine the position of the rack shaft 13. In this flowchart, ωa is a value obtained by dividing 2 π by La, and ωb is a value obtained by dividing 2 π by Lb. ωa=157.08 [rad/m] when La=0.040 [m] as described above, and ωb=179.52 [rad/m] when Lb=0.035 [m].

In the calculation processing shown in the flowchart, the CPU 100 determines Xa by the above equation (1) (Step S1) and Xb by the above equation (2) (Step S2). Next, the CPU 100 determines whether or not ωb·Xb−ωa·Xa is not less than 0 (Step S3), and the position of the rack shaft 13 is determined by the following equation (3) when ωb·Xb−ωa·Xa is not less than 0 (Step S4), and the position of the rack shaft 13 is determined by the following equation (4) when ωb·Xb−ωa·Xa is less than 0 (Step S5).

$$X = \frac{\omega b \cdot Xb - \omega a \cdot Xa}{\omega b - \omega a} \quad (3)$$

$$X = \frac{\omega b \cdot Xb - \omega a \cdot Xa + 2\pi}{\omega b - \omega a} \quad (4)$$

The CPU 100 outputs information of the determined position X of the rack shaft 13 to the steering controller 19 through the cable 103.

Figure 11:
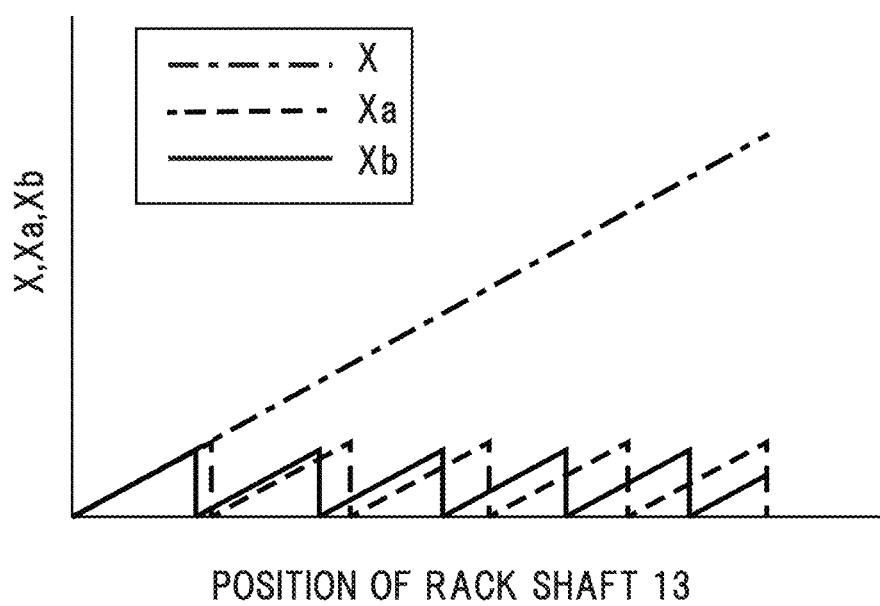
FIG. 11 is a graph showing a relationship between the positions of the rack shaft determined by the equations (1) and (2) and the position of the rack shaft determined by the equation (3) or (4).

FIG. 11 is a graph showing a relationship between the positions Xa and Xb of the rack shaft 13 determined by the above equations (1) and (2) and the position X of the rack shaft 13 determined by the above equation (3) or (4). In the present embodiment, since the ratio of La to Lb is greater than 1 and less than $n_2/n_1$, Xa changes at shorter intervals than Xb as shown in FIG. 11. This allows the absolute position of the rack shaft 13 relative to the housing 14 to be detected over the entire stroke range R.

Comparative Example

Figure 12:
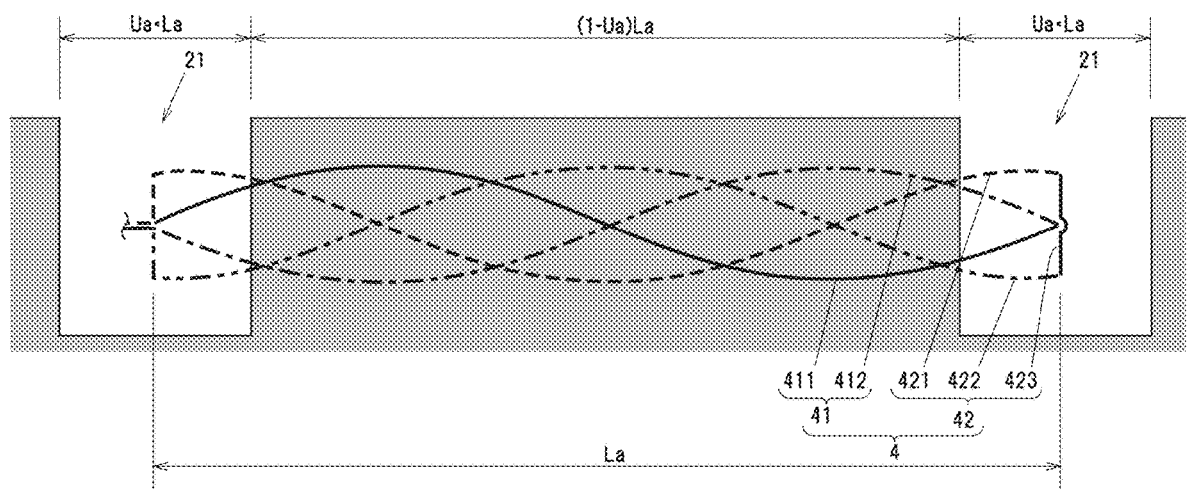
FIG. 12 is an explanatory diagram illustrating a configuration example of a detection coil set in Comparative Example, together with the two first detection object portions of the target.

FIG. 12 is an explanatory diagram illustrating a configuration example of a detection coil set 4 in Comparative Example, together with the two first detection object portions 21 of the target 2. The detection coil set 4 is composed of a combination of a sine wave-shaped detection coil 41 having a pair of sine wave-shaped coil conductor portions 411 and 412, and a cosine wave-shaped detection coil 42 having a pair of cosine wave-shaped conductor portions 421 and 422 and a short-circuit line 423. The sine wave-shaped detection coil 41 and the cosine wave-shaped detection coil 42 output a sinusoidal voltage in the same manner as the first detection coil 31 in the embodiment described above when the entire portion of one first detection object portion 21 lines up with the detection coil set 4 in the substrate normal direction, but change in the output voltage is gradual when only a part of the first detected portion 21 lines up with the detection coil set 4 in the substrate normal direction.

Figure 13:
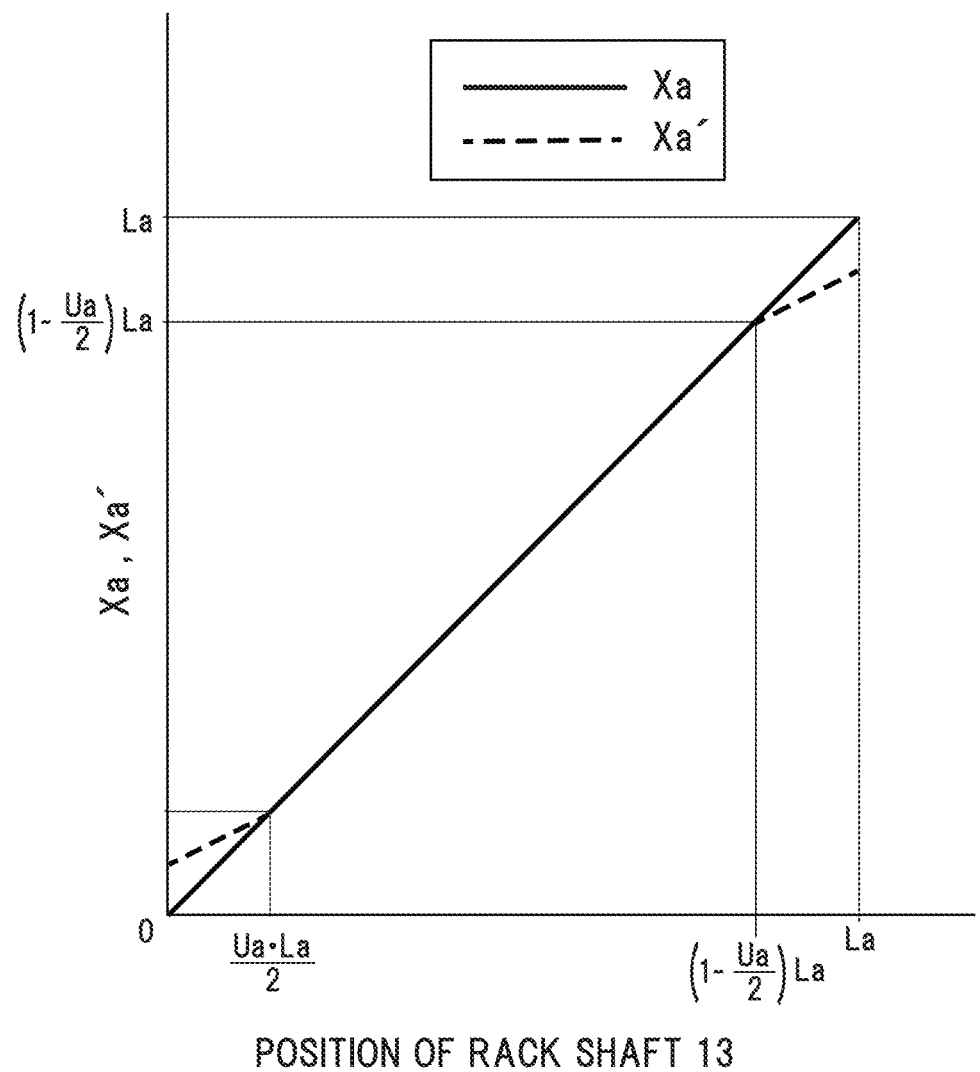
FIG. 13 is a graph showing comparison between the calculation result of the position of the rack shaft determined by the equation (1) based on output voltage of the first detection coil and the calculation result of the position of the rack shaft determined by a calculation expression similar to the equation (1) based on output voltage of the detection coil set in Comparative Example.

FIG. 13 is a graph showing comparison between the calculation result of the position Xa of the rack shaft 13 determined by the above equation (1) based on the output voltage of the first detection coil 31 and the calculation result of a position Xa' of the rack shaft 13 determined by a calculation expression similar to the above equation (1) based on the output voltage of the detection coil set 4. As shown in this graph, Xa and Xa' match in the range from (Ua·La)/2 to (1−Ua/2)La, but in the range from 0 to (Ua·La)/2 and in the range from (1−Ua/2)La to La, change in Xa' with respect to the position of the rack shaft 13 is gradual and this causes an error. This requires calculation for correction, which increases the calculation load on the CPU 100.

Effects of the Embodiment

In the present embodiment, since the output voltages of the first to fourth detection coils 31 to 34 provided on the substrate 3 change sinusoidally, it is possible to provide the stroke sensor 1 that is small and lightweight and capable of accurately determining the position of the rack shaft 13.

MODIFIED EXAMPLES OF DETECTION COIL

Next, Modified examples 1 to 4 of the detection coil will be described. Also with the detection coils in Modified examples 1 to 4, during movement of the rack shaft 13 in one direction, the output voltage of the detection coil changes sinusoidally over the entire period between when the detection coil and at least a portion of the detection object portion moving together with the rack shaft 13 begin to line up in the direction perpendicular to the moving direction of the rack shaft 13 and when the entire detection object portion becomes out of alignment with the detection coil in the direction perpendicular to the moving direction of the rack shaft 13, in the same manner as the embodiment described above. It is thereby possible to obtain the same functions and effects as those of the embodiment described above.

Modified Example 1 of Detection Coil

Figure 14:
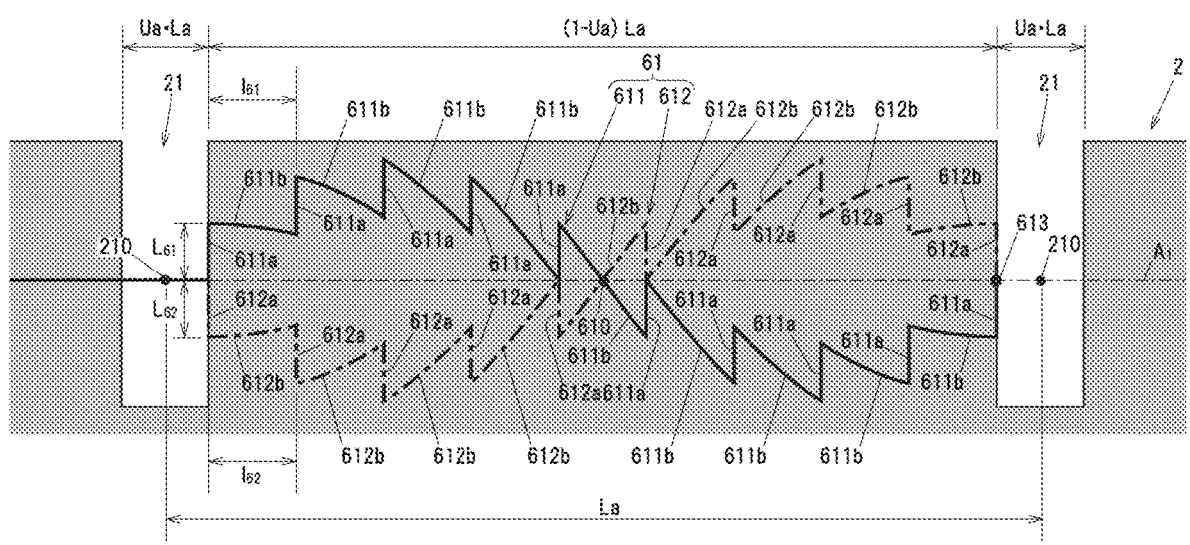
FIG. 14 is an explanatory diagram illustrating a detection coil in Modified example 1, together with a target combined with this detection coil.

FIG. 14 is an explanatory diagram illustrating a detection coil 61 in Modified example 1, together with the target 2 combined with this detection coil 61. In FIG. 14, the left-right direction of the drawing corresponds to the moving direction of the rack shaft 13 and the target 2. In addition, in FIG. 14, the distance in the longitudinal direction of the target 2 between the respective center points 210 of the first detection object portions 21 of the target 2 is denoted by La, and the ratio of the length of the first detection object portion 21 to this distance La is denoted by Ua, in the same manner as in FIG. 7. A length of the detection coil 61 in the moving direction of the rack shaft 13 is (1−Ua)La. In Modified example 1, Ua is 0.1.

The detection coil 61 has two coil conductor portions 611 and 612 that are spaced apart in the coil width direction (the up-down direction of the drawing in FIG. 14). Of those, the one coil conductor portion 611 is composed of plural line segment portions 611a linearly extending in a direction perpendicular to the moving direction of the rack shaft 13, and plural inclined portions 611b that are inclined with respect to the moving direction of the rack shaft 13 and connect between respective end portions of the plural line segment portions 611a.

The other coil conductor portion 612 is symmetric to the one coil conductor portion 611 across the symmetry axis $A_1$ and is composed of plural line segment portions 612a linearly extending in the direction perpendicular to the moving direction of the rack shaft 13, and plural inclined portions 612b that are inclined with respect to the moving direction of the rack shaft 13 and connect between respective end portions of the plural line segment portions 612a.

The two coil conductor portions 611 and 612 are formed on different layers of one substrate in the same manner as the embodiment described, and ends of the coil conductor portions 611 and 612 on one side in the moving direction of the rack shaft 13 are connected to each other through a via 613. Ends of the coil conductor portions 611 and 612 on the other side in the moving direction of the rack shaft 13 are connected to the calculation unit 101.

In Modified example 1, the coil conductor portion 611 is formed of ten line segment portions 611a and nine inclined portions 611b, and likewise, the coil conductor portion 612 is formed of ten line segment portions 612a and nine inclined portions 612b. The coil conductor portions 611 and 612 intersect at an intersection point 610 on the symmetry axis $A_1$. Each of the two coil conductor portions 611 and 612 is point-symmetric about the intersection point 610.

Intervals $I_{61}$ between the plural line segment portions 611a of the coil conductor portion 611 and intervals 162 between the plural line segment portions 612a of the coil conductor portion 612 in the moving direction of the rack shaft 13 are intervals corresponding to the length of the first detection object portion 21 in the moving direction of the rack shaft 13 and, in particular, are the same as Ua·La which is the length of the first detection object portion 21. In addition, a length $L_{61}$ of each of the plural line segment portions 611a of the coil conductor portion 611 and a length $L_{62}$ of each of the plural line segment portions 612a of the coil conductor portion 612 in the direction perpendicular to the moving direction of the rack shaft 13 are the same.

The intervals $I_{61}$ and $I_{62}$ of the plural line segment portions 611a and 612a and the lengths $L_{61}$ and $L_{62}$ of the plural line segment portions 611a and 612a are adjusted, e.g., by electromagnetic field simulation in such a manner that during movement of the rack shaft 13 in one direction, the output voltage of the detection coil 61 changes sinusoidally over the entire period between when the detection coil 61 and at least a portion of one detection object portion 21 begin to line up in the direction perpendicular to the moving direction of the rack shaft 13 and when the entire portion of the detection object portion 21 becomes out of alignment with the detection coil 61 in the direction perpendicular to the moving direction of the rack shaft 13.

Figure 15:
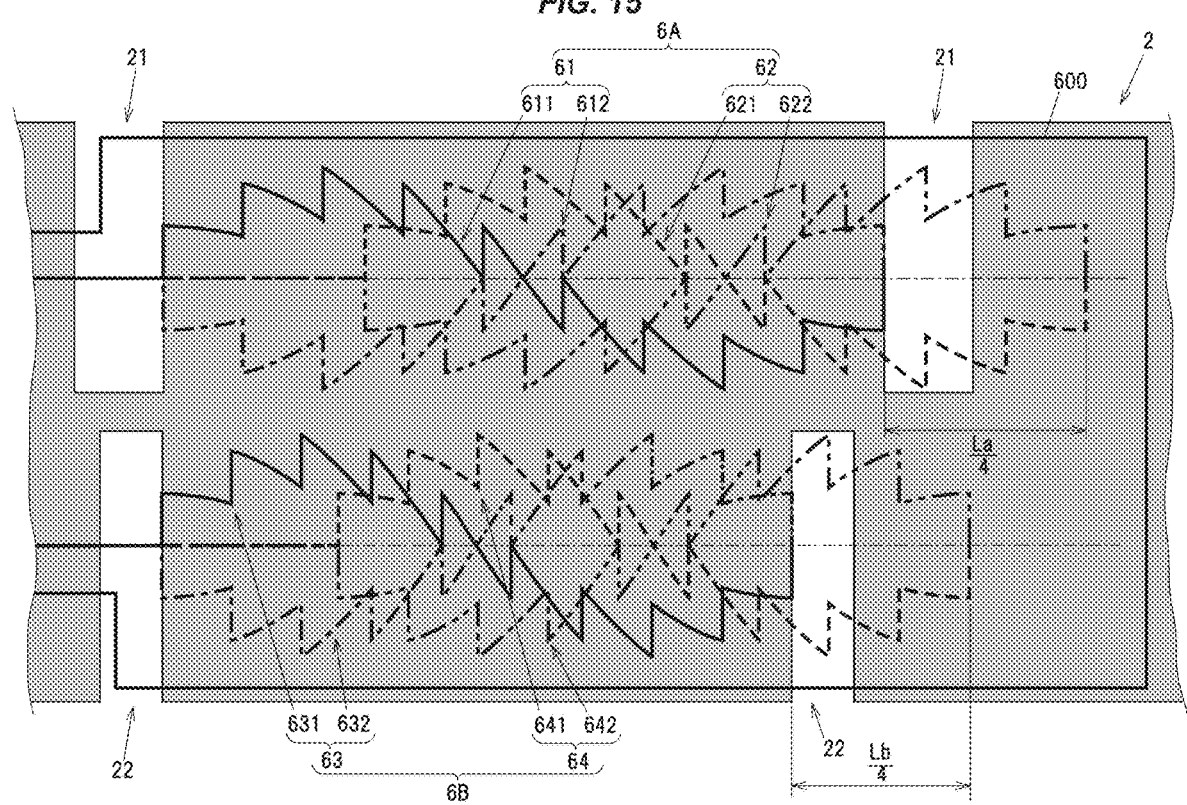
FIG. 15 is a configuration diagram illustrating a configuration example in which detection coils having the configuration shown in FIG. 14 are used to form a first detection coil set and a second detection coil set.

FIG. 15 is a configuration diagram illustrating a configuration example in which the detection coil 61 shown in FIG. 14 is used as a first detection coil 61, a first detection coil set 6A is composed of a combination of the first detection coil 61 and a second detection coil 62 configured in the same manner as the first detection coil 61, and a second detection coil set 6B is composed of a combination of third and fourth detection coils 63 and 64 which are shorter in length in the moving direction of the rack shaft 13 than the first and second detection coils 61 and 62. FIG. 15 also shows an exciting coil 600 surrounding the first detection coil set 6A and the second detection coil set 6B, and also shows the target 2 facing the first detection coil set 6A and the second detection coil set 6B. The exciting coil 600 has a rectangular shape which is long in the moving direction of the rack shaft 13, and extends in the moving direction of the rack shaft 13.

The first to fourth detection coils 61 to 64 and the exciting coil 600 are formed on one four-layered substrate having first to fourth metal layers in the same manner as the embodiment described above. A wiring pattern of the first metal layer is indicated by solid lines, a wiring pattern of the second metal layer is indicated by dashed lines, a wiring pattern of the third metal layer is indicated by dashed-dotted lines, and a wiring pattern of the fourth metal layer is indicated by dashed-double-dotted lines. The first detection coil 61 and the second detection coil 62 have the same length in the longitudinal direction of the exciting coil 600 and are offset from each other in the longitudinal direction of the exciting coil 600. The amount of this offset is La/4.

The second detection coil set 6B has a shape obtained by shrinking the first detection coil set 6A in the longitudinal direction of the exciting coil 600, and the third and fourth detection coils 63 and 64 are composed of plural line segment portions linearly extending in a direction perpendicular to the moving direction of the rack shaft 13 and plural inclined portions connecting between respective end portions of the plural line segment portions in the same manner as the detection coil 61 described in reference to FIG. 14 but are formed such that the length of the plural inclined portions in the longitudinal direction of the exciting coil 600 is shorter than that of first and second detection coils 61 and 62.

The third and fourth detection coils 63 and 64 are also offset from each other in the longitudinal direction of the exciting coil 600. The amount of the offset between the third detection coil 63 and the fourth detection coil 64 is Lb/4 where Lb is the distance between the plural second detection object portions 22 of the target 2, in the same manner as the embodiment described above. By combining the first detection coil set 6A and the second detection coil set 6B in this manner, it is possible to detect the absolute position of the rack shaft 13 over the entire stroke range R, as described in reference to FIGS. 9 to 11.

Modified Example 2 of Detection Coil

Figure 16:
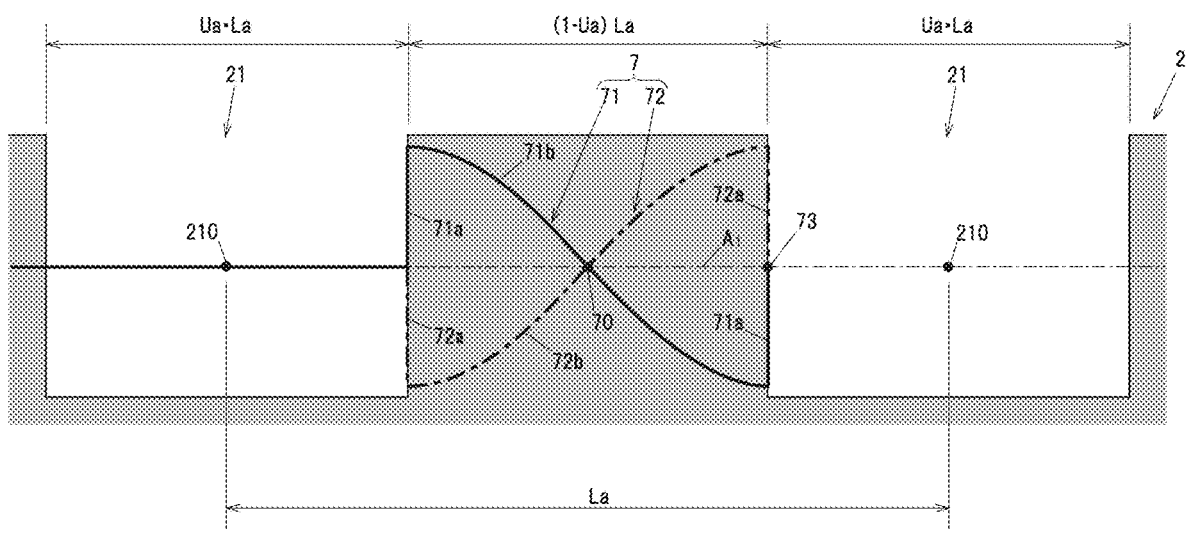
FIG. 16 is an explanatory diagram illustrating a detection coil in Modified example 2, together with a target combined with this detection coil.

FIG. 16 is an explanatory diagram illustrating a detection coil 7 in Modified example 2, together with the target 2 combined with this detection coil 7. The detection coil 7 has two coil conductor portions 71 and 72 that are spaced apart in the coil width direction. Of those, the one coil conductor portion 71 is composed of plural line segment portions 71a linearly extending in a direction perpendicular to the moving direction of the rack shaft 13, and an inclined portion 71b that is inclined with respect to the moving direction of the rack shaft 13 and connects between respective end portions of the plural line segment portions 71a.

The other coil conductor portion 72 is symmetric to the one coil conductor portion 71 across the symmetry axis A1 and is composed of plural line segment portions 72a linearly extending in the direction perpendicular to the moving direction of the rack shaft 13, and an inclined portion 72b that is inclined with respect to the moving direction of the rack shaft 13 and connects between respective end portions of the plural line segment portions 72a. In Modified example 2, the numbers of the line segment portions 71a and 72a of the coil conductor portions 71 and 72 are two, and the numbers of the inclined portions 71b and 72b are one.

The two coil conductor portions 71 and 72 are formed on different layers of one substrate in the same manner as the embodiment described, and ends of the coil conductor portions 71 and 72 on one side in the moving direction of the rack shaft 13 are connected to each other through a via 73. Ends of the coil conductor portions 71 and 72 on the other side in the moving direction of the rack shaft 13 are connected to the calculation unit 101. The coil conductor portions 71 and 72 intersect at an intersection point 70 on the symmetry axis $A_1$. Each of the two coil conductor portions 71 and 72 is point-symmetric about the intersection point 70. A length of the detection coil 7 in the moving direction of the rack shaft 13 is (1−Ua)La, and each interval between the plural line segment portions 71a and 72a of the coil conductor portions 71 and 72 is Ua·La. In Modified example 2, Ua is 0.5.

By using the detection coil 7 having the configuration of Modified example 2 and configuring in such a manner that, e.g., the first and second detection coil sets are composed of the combinations as described in Modified example 1 in reference to FIG. 15, it is possible to detect the absolute position of the rack shaft 13 over the entire stroke range R. The same applies to detection coils in Modified examples 3 and 4 described later.

Modified Example 3 of Detection Coil

Figure 17:
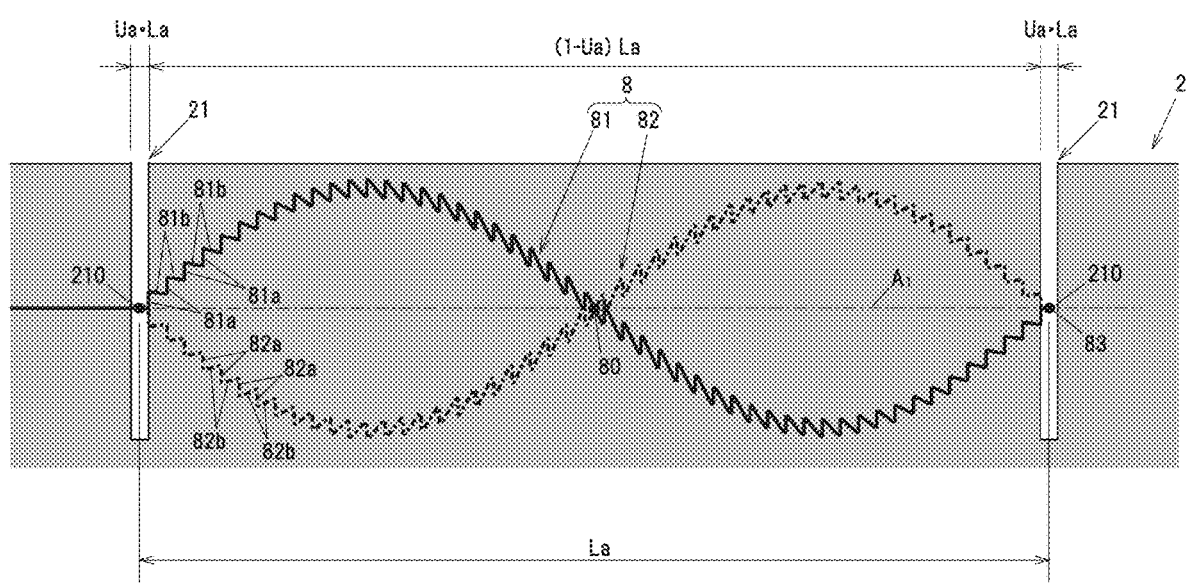
FIG. 17 is an explanatory diagram illustrating a detection coil in Modified example 3, together with a target combined with this detection coil.

FIG. 17 is an explanatory diagram illustrating a detection coil 8 in Modified example 3, together with the target 2 combined with this detection coil 8. The detection coil 8 has two coil conductor portions 81 and 82 that are spaced apart in the coil width direction. Of those, the one coil conductor portion 81 is composed of plural line segment portions 81a linearly extending in a direction perpendicular to the moving direction of the rack shaft 13, and plural inclined portions 81b that are inclined with respect to the moving direction of the rack shaft 13 and connect between respective end portions of the plural line segment portions 81a.

The other coil conductor portion 82 is symmetric to the one coil conductor portion 81 across the symmetry axis $A_1$ and is composed of plural line segment portions 82a linearly extending in the direction perpendicular to the moving direction of the rack shaft 13, and plural inclined portions 82b that are inclined with respect to the moving direction of the rack shaft 13 and connect between respective end portions of the plural line segment portions 82a. In Modified example 3, the numbers of the line segment portions 81a and 82a are fifty, and the numbers of the inclined portions 81b and 82b are forty-nine.

The two coil conductor portions 81 and 82 are formed on different layers of one substrate, and ends of the coil conductor portions 81 and 82 on one side in the moving direction of the rack shaft 13 are connected to each other through a via 83. Ends of the coil conductor portions 81 and 82 on the other side in the moving direction of the rack shaft 13 are connected to the calculation unit 101. The coil conductor portions 81 and 82 intersect at an intersection point 80 on the symmetry axis $A_1$. Each of the two coil conductor portions 81 and 82 is point-symmetric about the intersection point 80. A length of the detection coil 8 in the moving direction of the rack shaft 13 is (1−Ua)La, and each interval between the plural line segment portions 81a and 82a of the coil conductor portions 81 and 82 is Ua·La. In Modified example 3, Ua is 0.02.

Modified Example 4 of Detection Coil

Figure 18:
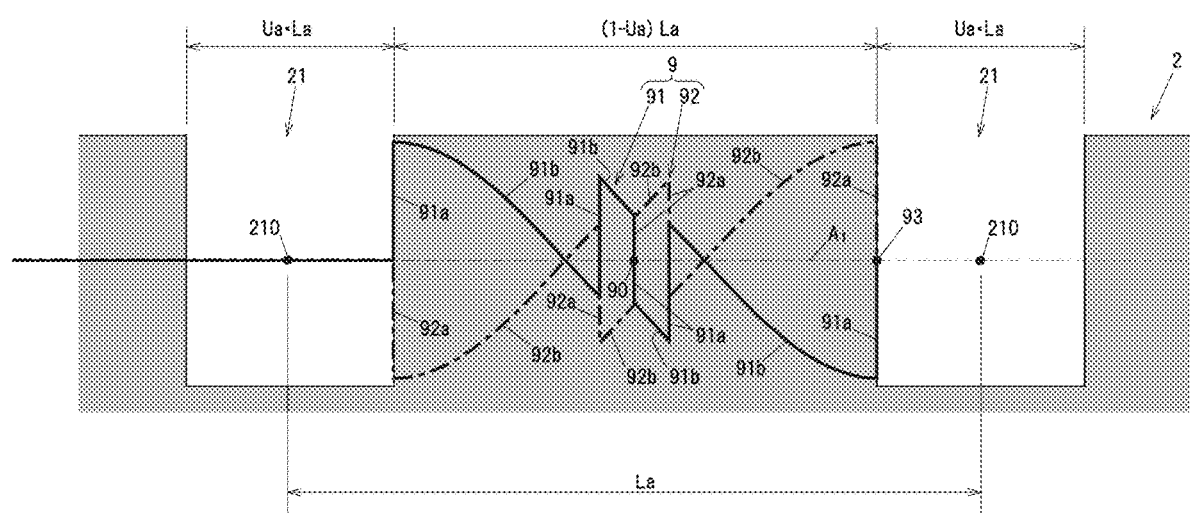
FIG. 18 is an explanatory diagram illustrating a detection coil in Modified example 4, together with a target combined with this detection coil.

FIG. 18 is an explanatory diagram illustrating a detection coil 9 in Modified example 4, together with the target 2 combined with this detection coil 9. The detection coil 9 has two coil conductor portions 91 and 92 that are spaced apart in the coil width direction. Of those, the one coil conductor portion 91 is composed of plural line segment portions 91a linearly extending in a direction perpendicular to the moving direction of the rack shaft 13, and plural inclined portions 91b that are inclined with respect to the moving direction of the rack shaft 13 and connect between respective end portions of the plural line segment portions 91a.

The other coil conductor portion 92 is symmetric to the one coil conductor portion 91 across the symmetry axis $A_1$ and is composed of plural line segment portions 92a linearly extending in the direction perpendicular to the moving direction of the rack shaft 13, and plural inclined portions 92b that are inclined with respect to the moving direction of the rack shaft 13 and connect between respective end portions of the plural line segment portions 92a. In Modified example 4, the numbers of the line segment portions 91a and 92a of the coil conductor portions 91 and 92 are five, and the numbers of the inclined portions 91b and 92b are four.

The two coil conductor portions 91 and 92 are formed on different layers of one substrate, and ends of the coil conductor portions 91 and 92 on one side in the moving direction of the rack shaft 13 are connected to each other through a via 93. Ends of the coil conductor portions 91 and 92 on the other side in the moving direction of the rack shaft 13 are connected to the calculation unit 101. The coil conductor portions 91 and 92 intersect at an intersection point 90 on the symmetry axis $A_1$. Each of the two coil conductor portions 91 and 92 is point-symmetric about the intersection point 90. A length of the detection coil 9 in the moving direction of the rack shaft 13 is (1−Ua)La, and Ua is 0.3 in Modified example 4.

In Modified example 4, the interval between the line segment portions 91a, 92a located at both ends of the coil conductor portion 91, 92 in the moving direction of the rack shaft 13 and the line segment portions 91a, 92a adjacent to thereto is Ua·La, but each interval between the plural line segment portions 91a, 92a at the center portion of the detection coil 9 is Ua·La/6. Even when the intervals of the plural line segment portions 91a and 92a are different at some portions in this manner, the output voltage of the detection coil 9 changes sinusoidally.

Summary of the Embodiment and Modifications

Technical ideas understood from the embodiment and modifications will be described below citing the reference signs, etc., used for the embodiment and modifications. However, each reference sign, etc., described below is not intended to limit the constituent elements in the claims to the members, etc., specifically described in the embodiment and modifications.

According to the first feature, a position detection device (the stroke sensor 1) configured to detect a position of a moving member (the rack shaft 13) that moves back and forth in a predetermined moving direction, the position detection device 1 comprising: an exciting coil 300, 600 arranged to extend in the moving direction along the moving member 13; a detection coil 31-34, 61-64, 7-9 that, by a magnetic field generated by the exciting coil 300, 600, outputs a voltage corresponding to a position of a detection object portion 21, 22 moving together with the moving member 13 within a predetermined detection range in the moving direction; and a calculation unit 101 that determines the position of the moving member 13 by calculation based on an output voltage of the detection coil 31-34, 61-64, 7-9, wherein the detection object portion 21, 22 has a predetermined length in the moving direction, and a voltage is generated in the detection coil 31-34, 61-64, 7-9 due to a difference in magnetic field intensity between a portion corresponding to the detection object portion 21, 22 and a portion not corresponding to the detection object portion 21, 22, and wherein during movement of the moving member 13 in one direction, the output voltage of the detection coil 31-34, 61-64, 7-9 changes sinusoidally over the entire period between when the detection coil 31-34, 61-64, 7-9 and at least a portion of the detection object portion 21, 22 begin to line up in a direction perpendicular to the moving direction and when the entire detection object portion 21, 22 becomes out of alignment with the detection coil 31-34, 61-64, 7-9 in the direction perpendicular to the moving direction.

According to the second feature, in the position detection device 1 as described by the first feature, the detection coil 31-34 comprises two coil conductor portions 311, 312, 321, 322, 331, 332, 341, 342 spaced apart in a coil width direction perpendicular to an extending direction of the exciting coil 300 in such a manner that a distance between the two coil conductor portions 311, 312, 321, 322, 331, 332, 341, 342 is smallest at both end portions 31a, 31b, 32a, 32b, 33a, 33b, 34a, 34b of the detection coil 31-34, an intersection portion 31c, 32c, 33c, 34c at which the two coil conductor portions 311, 312, 321, 322, 331, 332, 341, 342 intersect, and a maximum portion 31d, 31e, 32d, 32e, 33d, 33e, 34d, 34e at which the distance between the two coil conductor portions 311, 312, 321, 322, 331, 332, 341, 342 in the coil width direction is largest, and wherein the two coil conductor portions 311, 312, 321, 322, 331, 332, 341, 342 are inclined such that an inclination with respect to the moving direction between the end portion 31a, 31b, 32a, 32b, 33a, 33b, 34a, 34b of the detection coil 31-34 and the maximum portion 31d, 31e, 32d, 32e, 33d, 33e, 34d, 34e is greater than an inclination with respect to the moving direction between the maximum portion 31d, 31e, 32d, 32e, 33d, 33e, 34d, 34e and the intersection portion 31c, 32c, 33c, 34c.

According to the third feature, in the position detection device 1 as described by the first feature, the detection coil 61-64, 7-9 comprises two coil conductor portions 611, 612, 621, 622, 631, 632, 641, 642, 71, 72, 81, 82, 91, 92 spaced apart in a coil width direction perpendicular to an extending direction of the exciting coil 600, and wherein each of the two coil conductor portions 611, 612, 621, 622, 631, 632, 641, 642, 71, 72, 81, 82, 91, 92 comprises a plurality of line segment portions 611a, 612a, 71a, 72a, 81a, 82a, 91a, 92a linearly extending in a direction perpendicular to the moving direction, and an inclined portion 611b, 612b, 71b, 72b, 81b, 82b, 91b, 92b being inclined with respect to the moving direction and connecting between respective end portions of the plurality of line segment portions 611a, 612a, 71a, 72a, 81a, 82a, 91a, 92a.

According to the fourth feature, in the position detection device 1 as described by the third feature, an interval between the plurality of line segment portions 611a, 612a, 71a, 72a, 81a, 82a, 91a, 92a in the moving direction is an interval corresponding to the predetermined length of the detection object portion 21, 22.

According to the fifth feature, in the position detection device 1 as described by any one of the second to fourth features, a plurality of the detection coils 31-34, 61-64, 7-9 are arranged offset in the extending direction of the exciting coil 300, 600.

According to the sixth feature, the position detection device 1 as described by any one of the second to fourth features comprises first and second detection coil sets 3A, 3B, 6A, 6B each comprising a combination of a plurality of the detection coils 31-34, 61-64, 7-9, wherein the first and second detection coil sets 3A, 3B, 6A, 6B are arranged side by side in a direction perpendicular to the extending direction of the exciting coil 300, 600, and wherein each of the first and second detection coil sets 3A, 3B, 6A, 6B is configured in such a manner that a plurality of the detection coils 31-34, 61-64, 7-9 are arranged offset in the extending direction of the exciting coil 300, 600.

According to the seventh feature, in the position detection device 1 as described by the sixth feature, a length of a plurality of the detection coils 31, 32, 61, 62 constituting the first detection coil set 3A, 6A along the extending direction of the exciting coil 300, 600 is different from a length of a plurality of the detection coils 33, 34, 63, 64 constituting the second detection coil set 3B, 6B along the extending direction of the exciting coil 300, 600.

According to the eighth feature, in the position detection device 1 as described by the seventh feature, a plurality of the detection object portions 21 are provided so as to correspond to the first detection coil set 3A, 6A, and wherein a plurality of the detection object portions 22 are provided so as to correspond to the second detection coil set 3B, 6B.

According to the ninth feature, in the position detection device 1 as described by the eighth feature, a plurality of the detection coils 31-34, 61-64, 7-9 are formed on one substrate 3, and wherein the exciting coil 300, 600 is formed on the substrate 3 so as to surround the plurality of detection coils 31-34, 61-64, 7-9.

According to the tenth feature, the position detection device 1 as described by the first feature further comprises a conductive member (the target 2) attached to the moving member 13, wherein the detection object portion 21, 22 is formed on the conductive member 2.

Although the embodiment and modifications of the invention have been described, the invention according to claims is not to be limited to the embodiment and modifications described above. Further, please note that not all combinations of the features described in each of the embodiment and modifications are necessary to solve the problem of the invention.

In addition, the invention can be appropriately modified and implemented without departing from the gist thereof. For example, although the example in which the first detection object portions 21 and the second detection object portions 22 are formed as recesses on the target 2 has been described in the embodiment, it is not limited thereto. The first and second detection object portions may be conductive projections protruding toward the substrate 3. In addition, although the example in which the moving member subjected to position detection by the stroke sensor 1 is the rack shaft 13 of the steering system 10 has been described in the embodiment, the moving member to be detected is not limited thereto and may be a shaft to be mounted on an automobile or a shaft not to be mounted on an automobile. In addition, the shape of the moving member is not limited to a shaft shape and can be various shapes such as a flat plate shape.

The invention claimed is:

1. A position detection device configured to detect a position of a moving member that moves back and forth in a predetermined moving direction, the position detection device comprising:
    an exciting coil arranged to extend in the moving direction along the moving member;
    a detection coil that, by a magnetic field generated by the exciting coil, outputs a voltage corresponding to a position of a detection object portion moving together with the moving member within a predetermined detection range in the moving direction; and
    a calculation unit that determines the position of the moving member by calculation based on an output voltage of the detection coil,
    wherein the detection object portion has a predetermined length in the moving direction, and a voltage is generated in the detection coil due to a difference in magnetic field intensity between a portion corresponding to the detection object portion and a portion not corresponding to the detection object portion, and
    wherein during movement of the moving member in one direction, the output voltage of the detection coil changes sinusoidally over the entire period between when the detection coil and at least a portion of the detection object portion begin to line up in a direction perpendicular to the moving direction and when the entire detection object portion becomes out of alignment with the detection coil in the direction perpendicular to the moving direction.

2. The position detection device according to claim 1, wherein the detection coil comprises two coil conductor portions spaced apart in a coil width direction perpendicular to an extending direction of the exciting coil in such a manner that a distance between the two coil conductor portions is smallest at both end portions of the detection coil, an intersection portion at which the two coil conductor portions intersect, and a maximum portion at which the distance between the two coil conductor portions in the coil width direction is largest, and wherein the two coil conductor portions are inclined such that an inclination with respect to the moving direction between the end portion of the detection coil and the maximum portion is greater than an inclination with respect to the moving direction between the maximum portion and the intersection portion.

3. The position detection device according to claim 1, wherein the detection coil comprises two coil conductor portions spaced apart in a coil width direction perpendicular to an extending direction of the exciting coil, and wherein each of the two coil conductor portions comprises a plurality of line segment portions linearly extending in a direction perpendicular to the moving direction, and an inclined portion being inclined with respect to the moving direction and connecting between respective end portions of the plurality of line segment portions.

4. The position detection device according to claim 3, wherein an interval between the plurality of line segment portions in the moving direction is an interval corresponding to the predetermined length of the detection object portion.

5. The position detection device according to claim 2, wherein a plurality of the detection coils are arranged offset in the extending direction of the exciting coil.

6. The position detection device according to claim 2, comprising:
   first and second detection coil sets each comprising a combination of a plurality of the detection coils,
   wherein the first and second detection coil sets are arranged side by side in a direction perpendicular to the extending direction of the exciting coil, and
   wherein each of the first and second detection coil sets is configured in such a manner that a plurality of the detection coils are arranged offset in the extending direction of the exciting coil.

7. The position detection device according to claim 6, wherein a length of a plurality of the detection coils constituting the first detection coil set along the extending direction of the exciting coil is different from a length of a plurality of the detection coils constituting the second detection coil set along the extending direction of the exciting coil.

8. The position detection device according to claim 7, wherein a plurality of the detection object portions are provided so as to correspond to the first detection coil set, and
   wherein a plurality of the detection object portions are provided so as to correspond to the second detection coil set.

9. The position detection device according to claim 8, wherein a plurality of the detection coils are formed on one substrate, and
   wherein the exciting coil is formed on the substrate so as to surround the plurality of detection coils.

10. The position detection device according to claim 1, further comprising:
   a conductive member attached to the moving member,
   wherein the detection object portion is formed on the conductive member.

* * * * *